US010849083B2

(12) United States Patent
Li et al.

(10) Patent No.: US 10,849,083 B2
(45) Date of Patent: Nov. 24, 2020

(54) D2D SYNCHRONIZATION METHOD, USER EQUIPMENT, AND SERVING CELL

(71) Applicant: Huawei Technologies Co., Ltd., Shenzhen (CN)

(72) Inventors: Mingchao Li, Beijing (CN); Guanglin Han, Munich (DE); Zhenzhen Cao, Beijing (CN); Deping Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 15/872,204

(22) Filed: Jan. 16, 2018

(65) Prior Publication Data
US 2018/0139710 A1    May 17, 2018

Related U.S. Application Data

(63) Continuation of application No. PCT/CN2015/086503, filed on Aug. 10, 2015.

(51) Int. Cl.
*H04W 56/00* (2009.01)
*H04W 76/27* (2018.01)
*H04W 88/02* (2009.01)

(52) U.S. Cl.
CPC ......... *H04W 56/001* (2013.01); *H04W 56/00* (2013.01); *H04W 76/27* (2018.02); *H04W 88/02* (2013.01)

(58) Field of Classification Search
None
See application file for complete search history.

(56) References Cited

U.S. PATENT DOCUMENTS

2010/0240312 A1    9/2010 Peng et al.
2014/0153390 A1    6/2014 Ishii et al.
(Continued)

FOREIGN PATENT DOCUMENTS

CN    103718514 A    4/2014
CN    104412676 A    3/2015
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331, V12.6.0, pp. 1-449, 3rd Generation Partnership Project, Valbonne, France (Jun. 2015).
(Continued)

*Primary Examiner* — Ricky Q Ngo
*Assistant Examiner* — Stephen N Steiner
(74) *Attorney, Agent, or Firm* — Leydig, Voit & Mayer, Ltd.

(57) ABSTRACT

The present invention discloses a D2D synchronization method, user equipment, and a serving cell. The method includes: acquiring, by user equipment, synchronization control information of a serving cell; acquiring an identity of a first synchronization signal sent by a first synchronization source that is obtained through searching on a second transmission carrier frequency, and signal quality of the first synchronization source; determining, according to the identity of the first synchronization signal, the signal quality of the first synchronization source, and the synchronization control information, whether to start to send a synchronization signal; sending, by the user equipment, a second synchronization signal on a third transmission carrier frequency whose frequency is different from a frequency of a carrier frequency of the serving cell, so that a problem of synchro-
(Continued)

nization between different user equipments in a multi-carrier frequency transmission scenario can be resolved.

19 Claims, 10 Drawing Sheets

(56) References Cited

U.S. PATENT DOCUMENTS

| | | | |
|---|---|---|---|
| 2014/0220895 A1 | 8/2014 | Wei et al. | |
| 2015/0117375 A1 | 4/2015 | Sartori et al. | |
| 2015/0181366 A1 | 6/2015 | Chae et al. | |
| 2016/0345307 A1 | 11/2016 | Huang et al. | |
| 2017/0012753 A1 | 1/2017 | Kim et al. | |
| 2018/0213499 A1 * | 7/2018 | Lee | H04W 56/002 |

FOREIGN PATENT DOCUMENTS

| | | | |
|---|---|---|---|
| CN | 104812025 A | 7/2015 | |
| CN | 104812058 A | 7/2015 | |
| EP | 2858293 A2 | 4/2015 | |
| EP | 3065485 A1 * | 9/2016 | H04W 72/04 |
| EP | 3065485 A1 | 9/2016 | |
| RU | 2503153 C2 | 12/2013 | |
| WO | 2015064679 A1 | 5/2015 | |
| WO | 2015106654 A1 | 7/2015 | |
| WO | 2015111851 A1 | 7/2015 | |
| WO | 2015111908 A1 | 7/2015 | |
| WO | 2015113247 A1 | 8/2015 | |

OTHER PUBLICATIONS

NTT Docomo, Inc., "Enhancement for Inter-carrier D2D Discovery", 3GPP TSG-RAN WG2#90, R2-152333, May 29, 2015, total 4 pages.

LG Electronics Inc., "Prioritized reselection of D2D supported frequency", 3GPP TSG-RAN WG2#87, R2-143740, Aug. 22, 2014, total 3 pages.

Intel Corporation, "D2D Discovery Support in the Presence of Multiple carriers and PLMNs", 3GPP TSG-RAN WG1#81, R1-152629, May 29, 2015, total 5 pages.

Panasonic, "Rough synchronization procedure in D2D", 3GPP TSG-RAN WG1#77, R1-142192, May 23, 2014, total 4 pages.

Huawei, HiSilicon, "Synchronization for V2X", 3GPP TSG-RAN WG1#83, R1-156481, Nov. 22, 2015, total 4 pages.

* cited by examiner

A serving cell sends synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and determine, according to the identity of the first synchronization signal and the signal quality of the first synchronization source, whether to send a second synchronization signal on a third transmission carrier frequency ⟋ S701

The serving cell sends synchronization source detection control information to second user equipment, where the synchronization source detection control information is used to instruct the second user equipment to acquire an identity of a third synchronization signal sent by a second synchronization source that is obtained through searching on a fourth transmission carrier frequency, and signal quality of a third synchronization source, and determine, according to the identity of the third synchronization signal and the signal quality of the third synchronization source, whether to use the second synchronization source as a synchronization source that performs D2D communication on a fifth transmission carrier frequency ⟋ S702

FIG. 10

A serving cell sends synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and when it is determined according to the identity of the first synchronization signal and the signal quality of the first synchronization source that a synchronization signal needs to be sent, send the identity of the first synchronization signal and the signal quality of the first synchronization source to the serving cell ⟋ S801

The serving cell receives the identity of the first synchronization signal and the signal quality of the first synchronization source that are sent by the first user equipment ⟋ S802

The serving cell sends dedicated indication information to the first user equipment according to the identity of the first synchronization signal and the signal quality of the first synchronization source, where the dedicated indication information is used to instruct the first user equipment to determine a second synchronization signal according to the dedicated indication information ⟋ S803

FIG. 11

D2D SYNCHRONIZATION METHOD, USER EQUIPMENT, AND SERVING CELL

CROSS-REFERENCE TO RELATED APPLICATIONS

This application is a continuation of International Application No. PCT/CN2015/086503, filed on Aug. 10, 2015, which is hereby incorporated by reference in their entireties.

TECHNICAL FIELD

Embodiments of the present invention relate to the field of communications technologies, and in particular, to a D2D synchronization method, user equipment, and a serving cell.

BACKGROUND

The device-to-device (D2D) communications technology is a technology allowing terminals to perform direct communication under control of a system. However, a frequency used to transmit some special services by means of D2D communication may be different from a frequency of a current serving cell, and for these special services, D2D communication needs to be performed on a dedicated transmission carrier frequency. For example, FIG. 1 is a schematic diagram of V2V/V2I communication. A frequency used to perform vehicle to vehicle (V2V) communication/vehicle to infrastructure (V2I) communication service transmission may be different from a frequency of a current serving cell.

The prior art involves only a synchronous sending mechanism used when a service transmission carrier frequency is the same as a carrier frequency of a current serving cell. That is, if user equipment can obtain a serving cell obtained through searching on the service transmission carrier frequency, the user equipment is synchronized with the serving cell; or if user equipment cannot obtain a cell through searching or is on an edge of the serving cell, the user equipment is synchronized with a surrounding synchronization source or the user equipment itself sends a synchronization signal. The prior art does not support a synchronization mechanism used when the service transmission carrier frequency and a current serving carrier frequency are located on different frequencies. Therefore, a problem of synchronization between different user equipments in a multi-carrier frequency transmission scenario needs to be resolved.

SUMMARY

Embodiments of the present invention provide a D2D synchronization method, user equipment, and a serving cell, to resolve a problem of synchronization between different user equipments in a multi-carrier frequency transmission scenario.

According to a first aspect, a device-to-device (D2D) synchronization method is provided, where the method includes:

acquiring, by first user equipment, synchronization control information of a serving cell, where the serving cell is located on a first transmission carrier frequency;

acquiring, by the first user equipment, an identity of a first synchronization signal sent by a first synchronization source that is obtained through searching on a second transmission carrier frequency, and signal quality of the first synchronization source;

determining, by the first user equipment according to the identity of the first synchronization signal, the signal quality of the first synchronization source, and the synchronization control information, whether to start to send a synchronization signal; and if it is determined to start to send a synchronization signal, sending, by the first user equipment, a second synchronization signal on a third transmission carrier frequency, where the second synchronization signal is used to instruct at least one second user equipment on the third transmission carrier frequency to perform synchronization according to the second synchronization signal, and a frequency of the third transmission carrier frequency is different from a frequency of the first transmission carrier frequency.

In a first possible implementation manner, before the acquiring, by the first user equipment, an identity of a first synchronization signal sent by a first synchronization source that is obtained through searching on a second transmission carrier frequency, and signal quality of the first synchronization source, the method further includes:

acquiring, by the first user equipment, information about a frequency of the second transmission carrier frequency by using preconfigured information, by receiving system broadcast information sent by the serving cell, or by receiving Radio Resource Control (RRC) dedicated control signaling sent by the serving cell, where the information about the frequency is used to instruct the first user equipment to search for a synchronization signal on the second transmission carrier frequency corresponding to the information about the frequency.

With reference to the first aspect or the first possible implementation manner of the first aspect, in a second possible implementation manner, the synchronization control information includes a dedicated synchronization signal identity and a first preset threshold; and the determining, by the first user equipment according to the identity information of the first synchronization signal, the signal quality of the first synchronization source, and the synchronization control information, whether to start to send a synchronization signal includes:

when the identity of the first synchronization signal is the same as the dedicated synchronization signal identity and the signal quality of the first synchronization source is less than the first preset threshold, determining, by the first user equipment, to start to send a synchronization signal; or when no synchronization signal is obtained through searching, determining, by the first user equipment, to start to send a synchronization signal.

With reference to the first aspect, the first possible implementation manner of the first aspect, or the second possible implementation manner of the first aspect, in a third possible implementation manner, the synchronization control information includes a dedicated synchronization signal identity and a second preset threshold; and the determining, according to the identity information of the first synchronization signal, the signal quality of the first synchronization source, and the synchronization control information, whether to start to send a synchronization signal includes:

when the identity of the first synchronization signal is different from the dedicated synchronization signal identity and the signal quality of the first synchronization source is greater than the second preset threshold, determining, by the first user equipment, to start to send a synchronization signal.

With reference to the first aspect, the first possible implementation manner of the first aspect, the second possible implementation manner of the first aspect, or the third possible implementation manner of the first aspect, in a fourth possible implementation manner, after the determining, by the first user equipment, to start to send a synchronization signal, the method further includes:

using, by the first user equipment, a synchronization signal corresponding to the dedicated synchronization signal identity as the second synchronization signal; or sending, by the first user equipment, the identity of the first synchronization signal and the signal quality of the first synchronization source to the serving cell;

receiving, by the first user equipment, dedicated indication information sent by the serving cell; and using, by the first user equipment, a synchronization signal corresponding to the dedicated synchronization signal identity as the second synchronization signal according to the dedicated indication information.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the frequency of the second transmission carrier frequency is the same as the frequency of the third transmission carrier frequency.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the synchronization control information includes a dedicated synchronization signal identity, a priority corresponding to the dedicated synchronization signal identity, a first preset priority, and a third preset threshold; and the determining, according to the identity of the first synchronization signal, the signal quality of the first synchronization source, and the synchronization control information, whether to start to send a synchronization signal includes:

when the identity of the first synchronization signal is the same as the dedicated synchronization signal identity, the priority corresponding to the dedicated synchronization signal identity is greater than or equal to the first preset priority, and the signal quality of the first synchronization source is less than the third preset threshold, determining, by the first user equipment, to start to send a synchronization signal.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, after the determining, by the first user equipment, to start to send a synchronization signal, the method further includes:

using, by the first user equipment, a synchronization signal corresponding to the dedicated synchronization signal identity as the second synchronization signal; or acquiring, by the first user equipment, a first sidelink synchronization signal identity; and using, by the first user equipment, a synchronization signal corresponding to the first sidelink synchronization signal identity as the second synchronization signal, where the first sidelink synchronization signal identity is included in the synchronization control information and corresponds to the dedicated synchronization signal identity; and if the synchronization control information includes multiple dedicated synchronization signal identities, when the first user equipment detects multiple first synchronization sources to which a synchronization signal can be started to send, acquiring a first sidelink synchronization signal identity corresponding to a dedicated synchronization signal identity that has a highest priority and that can be used for starting to send a synchronization signal, and using a synchronization signal corresponding to the first sidelink synchronization signal identity as the second synchronization signal; or sending, by the first user equipment, the identity of the first synchronization signal and the signal quality of the first synchronization source to the serving cell;

receiving, by the first user equipment, dedicated indication information sent by the serving cell; and using, by the first user equipment, a synchronization signal corresponding to the dedicated synchronization signal identity as the second synchronization signal according to the dedicated indication information.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner, the synchronization control information includes a dedicated synchronization signal identity, a priority corresponding to the dedicated synchronization signal identity, a second preset priority, and a fourth preset threshold; and the determining, according to the identity of the first synchronization signal, the signal quality of the first synchronization source, and the synchronization control information, whether to start to send a synchronization signal includes:

when the identity of the first synchronization signal is the same as the dedicated synchronization signal identity, the priority corresponding to the dedicated synchronization signal identity is less than the second preset priority, and the signal quality of the first synchronization source is greater than the fourth preset threshold, determining, by the first user equipment, to start to send a synchronization signal.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner, after the determining, by the first user equipment, to start to send a synchronization signal, the method further includes:

using, by the first user equipment, a synchronization signal corresponding to the dedicated synchronization signal identity as the second synchronization signal; or acquiring, by the first user equipment, a second sidelink synchronization signal identity, and using a synchronization signal corresponding to the second sidelink synchronization signal identity as the second synchronization signal, where the second sidelink synchronization signal identity is included in the synchronization control information and corresponds to the dedicated synchronization signal identity; or sending, by the first user equipment, the identity of the first synchronization signal and the signal quality of the first synchronization source to the serving cell;

receiving, by the first user equipment, dedicated indication information sent by the serving cell; and using, by the first user equipment, a synchronization signal corresponding to the dedicated synchronization signal identity as the second synchronization signal according to the dedicated indication information.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner, the dedicated synchronization signal identity includes: a physical cell identity (PCI), a sidelink synchronization signal identity (SLSSID), a public land mobile network (PLMN) identity, or a transmission carrier frequency identity.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, or the tenth possible implementation manner of the first aspect, in an eleventh possible implementation manner, the method further includes:

acquiring the synchronization control information by using preconfigured information, by receiving system information broadcast by the serving cell, or by receiving RRC dedicated control signaling sent by the serving cell.

According to a second aspect, a D2D synchronization method is provided, where the method includes:

acquiring, by user equipment, synchronization source detection control information of a serving cell, where the serving cell is located on a first transmission carrier frequency;

acquiring, by the user equipment, an identity of a first synchronization signal sent by a first synchronization source that is obtained through searching on a second transmission carrier frequency, and signal quality of the first synchronization source; and determining, by the user equipment according to the identity of the first synchronization signal, the signal quality of the first synchronization source, and the synchronization source detection control information, whether to use the first synchronization source as a synchronization source that performs D2D communication on a third transmission carrier frequency, where a frequency of the third transmission carrier frequency is different from a frequency of the first transmission carrier frequency.

In a first possible implementation manner, before the acquiring, by the user equipment, an identity of a first synchronization signal sent by a first synchronization source that is obtained through searching on a second transmission carrier frequency, and signal quality of the first synchronization source, the method further includes:

acquiring, by the user equipment, information about a frequency of the second transmission carrier frequency by using preconfigured information, by receiving system broadcast information sent by the serving cell, or by receiving RRC dedicated control signaling sent by the serving cell, where the information about the frequency is used to instruct the user equipment to search for a synchronization signal on the second transmission carrier frequency corresponding to the information about the frequency.

With reference to the second aspect or the first possible implementation manner of the second aspect, in a second possible implementation manner, the synchronization source detection control information includes a dedicated synchronization signal identity and a first preset threshold; and the determining, by the user equipment according to the identity of the first synchronization signal, the signal quality of the first synchronization source, and the synchronization source detection control information, whether to use the first synchronization source as a synchronization source that performs D2D communication on a third transmission carrier frequency includes:

when the identity of the first synchronization signal is the same as the dedicated synchronization signal identity and the signal quality of the first synchronization source is greater than the first preset threshold, determining, by the user equipment, to use the first synchronization source as the synchronization source that performs D2D communication on the third transmission carrier frequency.

With reference to the second aspect, the first possible implementation manner of the second aspect, or the second possible implementation manner of the second aspect, in a third possible implementation manner, the synchronization source detection control information further includes a dedicated synchronization signal identity, a priority corresponding to the dedicated synchronization signal identity, and a second preset threshold; and the determining, by the user equipment according to the identity of the first synchronization signal, the signal quality of the first synchronization source, and the synchronization source detection control information, whether to use the first synchronization source as a synchronization source that performs D2D communication on a third transmission carrier frequency includes:

when the identity of the first synchronization signal is the same as the dedicated synchronization signal identity and the signal quality of the first synchronization source is greater than the second preset threshold, determining, by the user equipment, that the first synchronization source is a candidate synchronization source; and when at least one candidate synchronization source is determined, determining, by the user equipment, that a synchronization source with a highest priority corresponding to a dedicated synchronization signal identity in the at least one candidate synchronization source is the synchronization source that performs D2D communication on the third transmission carrier frequency.

With reference to the second aspect, the first possible implementation manner of the second aspect, the second possible implementation manner of the second aspect, or the third possible implementation manner of the second aspect, in a fourth possible implementation manner, the method further includes:

acquiring, by the user equipment, the synchronization source detection control information by using preconfigured information, by receiving system information broadcast by the serving cell, or by receiving RRC dedicated control signaling sent by the serving cell.

According to a third aspect, a D2D synchronization method is provided, where the method includes:

sending, by a first serving cell, synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and determine, according to the identity of the first synchronization signal and the signal quality of the first synchronization source, whether to send a second synchronization signal on a third transmission carrier frequency, the first serving cell is located on a first transmission carrier frequency, and a frequency of the first transmission carrier frequency is different from a frequency of the third transmission carrier frequency; and sending, by the serving cell, synchronization source detection control information to second user equipment, where the synchronization source detection control information is used to instruct the second user equipment to acquire an identity of a third synchronization signal sent by a second synchronization source that is obtained through searching on a fourth transmission carrier frequency, and signal quality of a third synchronization source, and determine, according to the identity of the third synchronization signal and the signal quality of the third synchronization source, whether to use the second synchronization source as a synchronization source that performs D2D communication on a fifth transmission carrier frequency, and a frequency of the fifth transmission carrier frequency is different from the frequency of the first transmission carrier frequency.

In a first possible implementation manner, the method further includes:

receiving, by the serving cell, the identity of the first synchronization signal and the signal quality of the first synchronization source that are sent by the first user equipment; and sending, by the serving cell, dedicated indication information to the first user equipment according to the identity of the first synchronization signal and the signal quality of the first synchronization source, where the dedicated indication information is used to instruct the first user equipment to determine the second synchronization signal according to the dedicated indication information.

According to a fourth aspect, user equipment is provided, where the user equipment includes:

an acquiring unit, configured to acquire synchronization control information of a serving cell, where the serving cell is located on a first transmission carrier frequency, where the acquiring unit is further configured to acquire an identity of a first synchronization signal sent by a first synchronization source that is obtained through searching on a second transmission carrier frequency, and signal quality of the first synchronization source;

a determining unit, configured to determine, according to the identity of the first synchronization signal, the signal quality of the first synchronization source, and the synchronization control information acquired by the first acquiring unit that are acquired by the acquiring unit, whether to start to send a synchronization signal; and a sending unit, configured to: if the determining unit determines to start to send a synchronization signal, send a second synchronization signal on a third transmission carrier frequency, where the second synchronization signal is used to instruct at least one second user equipment on the third transmission carrier frequency to perform synchronization according to the second synchronization signal, and a frequency of the third transmission carrier frequency is different from a frequency of the first transmission carrier frequency.

In a first possible implementation manner, the acquiring unit is further configured to:

acquire information about a frequency of the second transmission carrier frequency by using preconfigured information, by receiving system broadcast information sent by the serving cell, or by receiving RRC dedicated control signaling sent by the serving cell, where the information about the frequency is used to instruct the first user equipment to search for a synchronization signal on the second transmission carrier frequency corresponding to the information about the frequency.

With reference to the fourth aspect or the first possible implementation manner of the fourth aspect, in a second possible implementation manner, the synchronization control information includes a dedicated synchronization signal identity and a first preset threshold; and the determining unit is specifically configured to:

when the identity of the first synchronization signal is the same as the dedicated synchronization signal identity and the signal quality of the first synchronization source is less than the first preset threshold, determine to start to send a synchronization signal; or when no synchronization signal is obtained through searching, determine to start to send a synchronization signal.

With reference to the fourth aspect, the first possible implementation manner of the fourth aspect, or the second possible implementation manner of the fourth aspect, in a third possible implementation manner, the synchronization control information includes a dedicated synchronization signal identity and a second preset threshold; and the determining unit is specifically configured to:

when the identity of the first synchronization signal is different from the dedicated synchronization signal identity and the signal quality of the first synchronization source is greater than the second preset threshold, determine to start to send a synchronization signal.

With reference to the fourth aspect, the first possible implementation manner of the fourth aspect, the second possible implementation manner of the fourth aspect, or the third possible implementation manner of the fourth aspect, in a fourth possible implementation manner, the user equipment further includes: a synchronization unit and a receiving unit, where the synchronization unit is configured to use a synchronization signal corresponding to the dedicated synchronization signal identity as the second synchronization signal; or the sending unit is further configured to send the identity of the first synchronization signal and the signal quality of the first synchronization source that are acquired by the second acquiring unit to the serving cell;

the receiving unit is configured to receive dedicated indication information sent by the serving cell; and the synchronization unit is further configured to use a synchronization signal corresponding to the dedicated synchronization signal identity as the second synchronization signal according to the dedicated indication information received by the receiving unit.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner, the frequency of the second transmission carrier frequency is the same as the frequency of the third transmission carrier frequency.

With reference to the fourth aspect, the first possible implementation manner of the fourth aspect, the second possible implementation manner of the fourth aspect, the third possible implementation manner of the fourth aspect, the fourth possible implementation manner of the fourth aspect, or the fifth possible implementation manner of the fourth aspect, in a sixth possible implementation manner, the synchronization control information includes a dedicated synchronization signal identity, a priority corresponding to the dedicated synchronization signal identity, a first preset priority, and a third preset threshold; and the determining unit is specifically configured to:

when the identity of the first synchronization signal is the same as the dedicated synchronization signal identity, the priority corresponding to the dedicated synchronization signal identity is greater than or equal to the first preset priority, and the signal quality of the first synchronization source is less than the third preset threshold, determine to start to send a synchronization signal.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, or the sixth possible implementation manner of the fourth aspect, in a seventh possible implementation manner, the synchronization unit is further configured to use a synchronization signal corresponding to the dedicated synchronization signal identity as the second synchronization signal; or the acquiring unit is further configured to acquire a first sidelink synchronization signal identity;

the synchronization unit is further configured to use a synchronization signal corresponding to the first sidelink synchronization signal identity acquired by the acquiring unit as the second synchronization signal, where the first sidelink synchronization signal identity is included in the synchronization control information and corresponds to the dedicated synchronization signal identity; and if the synchronization control information includes multiple dedicated synchronization signal identities, when the first user equipment detects multiple first synchronization sources to which a synchronization signal can be started to send, acquire a first sidelink synchronization signal identity corresponding to a dedicated synchronization signal identity that has a highest priority and that can be used for starting to send a synchronization signal, and use a synchronization signal corresponding to the first sidelink synchronization signal identity as the second synchronization signal; or the sending unit is further configured to send the identity of the first synchronization signal and the signal quality of the first synchronization source that are acquired by the acquiring unit to the serving cell;

the receiving unit is further configured to receive dedicated indication information sent by the serving cell; and the synchronization unit is further configured to use a synchronization signal corresponding to the dedicated synchronization signal identity as the second synchronization signal according to the dedicated indication information received by the receiving unit.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, or the seventh possible implementation manner of the fourth aspect, in an eighth possible implementation manner, the synchronization control information includes a dedicated synchronization signal identity, a priority corresponding to the dedicated synchronization signal identity, a second preset priority, and a fourth preset threshold; and the determining unit is specifically configured to:

when the identity of the first synchronization signal is the same as the dedicated synchronization signal identity, the priority corresponding to the dedicated synchronization signal identity is less than the second preset priority, and the signal quality of the first synchronization source is greater than the fourth preset threshold, determine to start to send a synchronization signal.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, or the eighth possible implementation manner of the fourth aspect, in a ninth possible implementation manner, the synchronization unit is further configured to use a synchronization signal corresponding to the dedicated synchronization signal identity as the second synchronization signal; or the acquiring unit is further configured to acquire a second sidelink synchronization signal identity; and the synchronization unit is further configured to use a synchronization signal corresponding to the second sidelink synchronization signal identity acquired by the acquiring unit as the second synchronization signal, where the second sidelink synchronization signal identity is included in the synchronization control information and corresponds to the dedicated synchronization signal identity; or the sending unit is further configured to send the identity of the first synchronization signal and the signal quality of the first synchronization source to the serving cell;

the receiving unit is further configured to receive dedicated indication information sent by the serving cell; and the synchronization unit is further configured to use a synchronization signal corresponding to the dedicated synchronization signal identity as the second synchronization signal according to the dedicated indication information received by the receiving unit.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, the eighth possible implementation manner of the fourth aspect, or the ninth possible implementation manner of the fourth aspect, in a tenth possible implementation manner, the dedicated synchronization signal identity includes: a physical cell identity (PCI), a sidelink synchronization signal identity (SLSSID), a PLMN identity, or a transmission carrier frequency identity.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, the eighth possible implementation manner of the fourth aspect, the ninth possible implementation manner of the fourth aspect, or the tenth possible implementation manner of the fourth aspect, in an eleventh possible implementation manner, the acquiring unit is further configured to acquire the synchronization control signal by using preconfigured information, by receiving system information broadcast by the serving cell, or by receiving RRC dedicated control signaling sent by the serving cell.

According to a fifth aspect, user equipment is provided, where the user equipment includes:

an acquiring unit, configured to acquire synchronization source detection control information of a serving cell, where the serving cell is located on a first transmission carrier frequency, where the acquiring unit is further configured to acquire an identity of a first synchronization signal sent by a first synchronization source that is obtained through searching on a second transmission carrier frequency, and signal quality of the first synchronization source; and a determining unit, configured to determine, according to the identity of the first synchronization signal, the signal quality of the first synchronization source, and the synchronization source detection control information that are acquired by the acquiring unit, whether to use the first synchronization source as a synchronization source that performs D2D communication on a third transmission carrier frequency, where a frequency of the third transmission carrier frequency is different from a frequency of the first transmission carrier frequency.

In a first possible implementation manner, the acquiring unit is further configured to acquire information about a frequency of the second transmission carrier frequency by using preconfigured information, by receiving system broadcast information sent by the serving cell, or by receiving RRC dedicated control signaling sent by the serving cell, where the information about the frequency is used to instruct the user equipment to search for a synchronization signal on the second transmission carrier frequency corresponding to the information about the frequency.

With reference to the fifth aspect or the first possible implementation manner of the fifth aspect, in a second possible implementation manner, the synchronization source detection control information includes a dedicated synchronization signal identity and a first preset threshold; and the determining unit is specifically configured to:

when the identity of the first synchronization signal is the same as the dedicated synchronization signal identity and the signal quality of the first synchronization source is greater than the first preset threshold, use the first synchronization source as the synchronization source that performs D2D communication on the third transmission carrier frequency.

With reference to the fifth aspect, the first possible implementation manner of the fifth aspect, or the second possible implementation manner of the fifth aspect, in a third possible implementation manner, the synchronization source detection control information includes a dedicated synchronization signal identity and a second preset threshold;

the determining unit is specifically configured to:

when the identity of the first synchronization signal is the same as the dedicated synchronization signal identity and the signal quality of the first synchronization source is greater than the second preset threshold, determine that the first synchronization source is a candidate synchronization source; and the determining unit is further configured to: when at least one candidate synchronization source is determined, determine that a synchronization source with a highest priority corresponding to a dedicated synchronization signal identity in the at least one candidate synchronization source is the synchronization source that performs D2D communication on the third transmission carrier frequency.

With reference to the fifth aspect, the first possible implementation manner of the fifth aspect, the second possible implementation manner of the fifth aspect, or the third possible implementation manner of the fifth aspect, in a fourth possible implementation manner, the acquiring unit is further configured to acquire the synchronization source detection control information by using preconfigured information, by receiving system information broadcast by the serving cell, or by receiving RRC dedicated control signaling sent by the serving cell.

According to a sixth aspect, a serving cell is provided, where the serving cell includes:

a sending unit, configured to send synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and determine, according to the identity of the first synchronization signal and the signal quality of the first synchronization source, whether to send a second synchronization signal on a third transmission carrier frequency, the serving cell is located on a first transmission carrier frequency, and a frequency of the first transmission carrier frequency is different from a frequency of the third transmission carrier frequency, where the sending unit is further configured to send synchronization source detection control information to second user equipment, where the synchronization source detection control information is used to instruct the second user equipment to acquire an identity of a third synchronization signal sent by a second synchronization source that is obtained through searching on a fourth transmission carrier frequency, and signal quality of a third synchronization source, and determine, according to the identity of the third synchronization signal and the signal quality of the third synchronization source, whether to use the second synchronization source as a synchronization source that performs D2D communication on a fifth transmission carrier frequency, and a frequency of the fifth transmission carrier frequency is different from the frequency of the first transmission carrier frequency.

In a first possible implementation manner, the serving cell further includes:

a receiving unit, configured to receive the identity of the first synchronization signal and the signal quality of the first synchronization source that are sent by the first user equipment, where the sending unit is further configured to send dedicated indication information to the first user equipment according to the identity of the first synchronization signal and the signal quality of the first synchronization source that are received by the receiving unit, where the dedicated indication information is used to instruct the first user equipment to determine the second synchronization signal according to the dedicated indication information.

According to a seventh aspect, user equipment is provided, where the user equipment includes an input apparatus, an output apparatus, a processor, and a memory, where the processor performs the following steps:

acquiring synchronization control information of a serving cell, where the serving cell is located on a first transmission carrier frequency;

acquiring an identity of a first synchronization signal sent by a first synchronization source that is obtained through searching on a second transmission carrier frequency, and signal quality of the first synchronization source;

determining, according to the identity of the first synchronization signal, the signal quality of the first synchronization source, and the synchronization control information, whether to start to send a synchronization signal; and if it is determined to start to send a synchronization signal, sending a second synchronization signal on a third transmission carrier frequency, where the second synchronization signal is used to instruct at least one second user equipment on the third transmission carrier frequency to perform synchronization according to the second synchronization signal, and a frequency of the third transmission carrier frequency is different from a frequency of the first transmission carrier frequency.

In a first possible implementation manner, before the performing, by the processor, the step of acquiring an identity of a first synchronization signal sent by a first synchronization source that is obtained through searching on a second transmission carrier frequency, and signal quality of the first synchronization source, the processor further performs the following step:

acquiring information about a frequency of the second transmission carrier frequency by using preconfigured information, by receiving system broadcast information sent by the serving cell, or by receiving RRC dedicated control signaling sent by the serving cell, where the information about the frequency is used to instruct the first user equipment to search for a synchronization signal on the second transmission carrier frequency corresponding to the information about the frequency.

With reference to the seventh aspect or the first possible implementation manner of the seventh aspect, in a second possible implementation manner, the synchronization control information includes a dedicated synchronization signal identity and a first preset threshold; and the performing, by the processor, the step of determining, according to the identity information of the first synchronization signal, the signal quality of the first synchronization source, and the synchronization control information, whether to start to send a synchronization signal includes:

when the identity of the first synchronization signal is the same as the dedicated synchronization signal identity and the signal quality of the first synchronization source is less than the first preset threshold, determining, by the first user equipment, to start to send a synchronization signal; or when no synchronization signal is obtained through searching, determining, by the first user equipment, to start to send a synchronization signal.

With reference to the seventh aspect, the first possible implementation manner of the seventh aspect, or the second possible implementation manner of the seventh aspect, in a third possible implementation manner, the synchronization control information includes a dedicated synchronization signal identity and a second preset threshold; and the performing, by the processor, the step of determining, according to the identity information of the first synchronization signal, the signal quality of the first synchronization source, and the synchronization control information, whether to start to send a synchronization signal includes:

when the identity of the first synchronization signal is different from the dedicated synchronization signal identity and the signal quality of the first synchronization source is greater than the second preset threshold, determining to start to send a synchronization signal.

With reference to the seventh aspect, the first possible implementation manner of the seventh aspect, the second possible implementation manner of the seventh aspect, or the third possible implementation manner of the seventh aspect, in a fourth possible implementation manner, after the performing, by the processor the step of determining to start to send a synchronization signal, the processor further performs the following steps:

using a synchronization signal corresponding to the dedicated synchronization signal identity as the second synchronization signal; or sending the identity of the first synchronization signal and the signal quality of the first synchronization source to the serving cell;

receiving dedicated indication information sent by the serving cell; and using a synchronization signal corresponding to the dedicated synchronization signal identity as the second synchronization signal according to the dedicated indication information.

With reference to the seventh aspect, the first possible implementation manner of the seventh aspect, the second possible implementation manner of the seventh aspect, the third possible implementation manner of the seventh aspect, or the fourth possible implementation manner of the seventh aspect, in a fifth possible implementation manner, the frequency of the second transmission carrier frequency is the same as the frequency of the third transmission carrier frequency.

With reference to the seventh aspect, the first possible implementation manner of the seventh aspect, the second possible implementation manner of the seventh aspect, the third possible implementation manner of the seventh aspect, the fourth possible implementation manner of the seventh aspect, or the fifth possible implementation manner of the seventh aspect, in a sixth possible implementation manner, the synchronization control information includes a dedicated synchronization signal identity, a priority corresponding to the dedicated synchronization signal identity, a first preset priority, and a third preset threshold; and the performing, by the processor, the step of determining, according to the identity of the first synchronization signal, the signal quality of the first synchronization source, and the synchronization control information, whether to start to send a synchronization signal includes:

when the identity of the first synchronization signal is the same as the dedicated synchronization signal identity, the priority corresponding to the dedicated synchronization signal identity is greater than or equal to the first preset priority, and the signal quality of the first synchronization source is less than the third preset threshold, determining to start to send a synchronization signal.

With reference to the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, or the sixth possible implementation manner of the seventh aspect, in a seventh possible implementation manner, after the performing, by the processor, the step of determining to start to send a synchronization signal, the processor further performs the following steps:

using a synchronization signal corresponding to the dedicated synchronization signal identity as the second synchronization signal; or acquiring a first sidelink synchronization signal identity; and using a synchronization signal corresponding to the first sidelink synchronization signal identity as the second synchronization signal, where the first sidelink synchronization signal identity is included in the synchronization control information and corresponds to the dedicated synchronization signal identity; and if the synchronization control information includes multiple dedicated synchronization signal identities, when the first user equipment detects multiple first synchronization sources to which a synchronization signal can be started to send, acquiring a first sidelink synchronization signal identity corresponding to a dedicated synchronization signal identity that has a highest priority and that can be used for starting to send a synchronization signal, and using a synchronization signal corresponding to the first sidelink synchronization signal identity as the second synchronization signal; or sending the identity of the first synchronization signal and the signal quality of the first synchronization source to the serving cell;

receiving dedicated indication information sent by the serving cell; and using a synchronization signal corresponding to the dedicated synchronization signal identity as the second synchronization signal according to the dedicated indication information.

With reference to the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, or the seventh possible implementation manner of the seventh aspect, in an eighth possible implementation manner, the synchronization control information includes a dedicated synchronization signal identity, a priority corresponding to the dedicated synchronization signal identity, a second preset priority, and a fourth preset threshold; and the performing, by the processor, the step of determining, according to the identity of the first synchronization signal, the signal quality of the first synchronization source, and the synchronization control information, whether to start to send a synchronization signal includes:

when the identity of the first synchronization signal is the same as the dedicated synchronization signal identity, the priority corresponding to the dedicated synchronization signal identity is less than the second preset priority, and the signal quality of the first synchronization source is greater than the fourth preset threshold, determining to start to send a synchronization signal.

With reference to the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, or the eighth possible implementation manner of the seventh aspect, in a ninth possible implementation manner, after the performing, by the processor, the step of determining to start to send a synchronization signal, the processor further performs the following steps:

using a synchronization signal corresponding to the dedicated synchronization signal identity as the second synchronization signal; or acquiring a second sidelink synchronization signal identity; and using a synchronization signal corresponding to the second sidelink synchronization signal identity as the second synchronization signal, where the second sidelink synchronization signal identity is included in the synchronization control information and corresponds to the dedicated synchronization signal identity; or sending the identity of the first synchronization signal and the signal quality of the first synchronization source to the serving cell;

receiving dedicated indication information sent by the serving cell; and using a synchronization signal corresponding to the dedicated synchronization signal identity as the second synchronization signal according to the dedicated indication information.

With reference to the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, the eighth possible implementation manner of the seventh aspect, or the ninth possible implementation manner of the seventh aspect, in a tenth possible implementation manner, the dedicated synchronization signal identity includes: a physical cell identity (PCI), a sidelink synchronization signal identity (SLSSID), a PLMN identity, or a transmission carrier frequency identity.

With reference to the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, the eighth possible implementation manner of the seventh aspect, the ninth possible implementation manner of the seventh aspect, or the tenth possible implementation manner of the seventh aspect, in an eleventh possible implementation manner, the processor further performs the following step:

acquiring the synchronization control information by using preconfigured information, by receiving system information broadcast by the serving cell, or by receiving RRC dedicated control signaling sent by the serving cell.

According to an eighth aspect, user equipment is provided, where the user equipment includes an input apparatus, an output apparatus, a processor, and a memory, where the processor performs the following steps:

acquiring synchronization source detection control information of a serving cell, where the serving cell is located on a first transmission carrier frequency;

acquiring an identity of a first synchronization signal sent by a first synchronization source that is obtained through searching on a second transmission carrier frequency, and signal quality of the first synchronization source; and determining, according to the identity of the first synchronization signal, the signal quality of the first synchronization source, and the synchronization source detection control information, whether to use the first synchronization source as a synchronization source that performs D2D communication on a third transmission carrier frequency, where a frequency of the third transmission carrier frequency is different from a frequency of the first transmission carrier frequency.

In a first possible implementation manner, before the performing, by the processor, the step of acquiring an identity of a first synchronization signal sent by a first synchronization source that is obtained through searching on a second transmission carrier frequency, and signal quality of the first synchronization source, the processor further performs the following step:

acquiring information about a frequency of the second transmission carrier frequency by using preconfigured information, by receiving system broadcast information sent by the serving cell, or by receiving RRC dedicated control signaling sent by the serving cell, where the information about the frequency is used to instruct the user equipment to search for a synchronization signal on the second transmission carrier frequency corresponding to the information about the frequency.

With reference to the eighth aspect or the first possible implementation manner of the eighth aspect, in a second possible implementation manner, the synchronization source detection control information includes a dedicated synchronization signal identity and a first preset threshold; and the performing, by the processor, the step of determining, according to the identity of the first synchronization signal, the signal quality of the first synchronization source, and the synchronization source detection control information, whether to use the first synchronization source as a synchronization source that performs D2D communication on a third transmission carrier frequency includes:

when the identity of the first synchronization signal is the same as the dedicated synchronization signal identity and the signal quality of the first synchronization source is greater than the first preset threshold, determining to use the first synchronization source as the synchronization source that performs D2D communication on the third transmission carrier frequency.

With reference to the eighth aspect, the first possible implementation manner of the eighth aspect, or the second possible implementation manner of the eighth aspect, in a third possible implementation manner, the synchronization source detection control information includes a dedicated synchronization signal identity, a priority corresponding to the dedicated synchronization signal identity, and a second preset threshold; and the performing, by the processor, the step of determining, according to the identity of the first synchronization signal, the signal quality of the first synchronization source, and the synchronization source detection control information, whether to use the first synchronization source as a synchronization source that performs D2D communication on a third transmission carrier frequency includes:

when the identity of the first synchronization signal is the same as the dedicated synchronization signal identity and the signal quality of the first synchronization source is greater than the second preset threshold, determining that the first synchronization source is a candidate synchronization source; and when at least one candidate synchronization source is determined, determining that a synchronization source with a highest priority corresponding to a dedicated synchronization signal identity in the at least one candidate synchronization source is the synchronization source that performs D2D communication on the third transmission carrier frequency.

With reference to the eighth aspect, the first possible implementation manner of the eighth aspect, the second possible implementation manner of the eighth aspect, or the third possible implementation manner of the eighth aspect, in a fourth possible implementation manner, the user equipment further performs the following step:

acquiring the synchronization source detection control information by using preconfigured information, by receiving system information broadcast by the serving cell, or by receiving RRC dedicated control signaling sent by the serving cell.

According to a ninth aspect, a serving cell is provided, where the serving cell includes an input apparatus, an output apparatus, a processor, and a memory, where the processor performs the following steps:

sending synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and determine, according to the identity of the first synchronization signal and the signal quality of the first synchronization source, whether to send a second synchronization signal on a third transmission carrier frequency, the serving cell is located on a first transmission carrier frequency, and a frequency of the first transmission carrier frequency is different from a frequency of the third transmission carrier frequency; and sending synchronization source detection control information to second user equipment, where the synchronization source detection control information is used to instruct the second user equipment to acquire an identity of a third synchronization signal sent by a second synchronization source that is obtained through searching on a fourth transmission carrier frequency, and signal quality of a third synchronization source, and determine, according to the identity of the third synchronization signal and the signal quality of the third synchronization source, whether to use the second synchronization source as a synchronization source that performs D2D communication on a fifth transmission carrier frequency, and a frequency of the fifth transmission carrier frequency is different from the frequency of the first transmission carrier frequency.

In a first possible implementation manner, the processor further performs the following steps:

receiving the identity of the first synchronization signal and the signal quality of the first synchronization source that are sent by the first user equipment; and sending dedicated indication information to the first user equipment according to the identity of the first synchronization signal and the signal quality of the first synchronization source, where the dedicated indication information is used to instruct the first user equipment to determine the second synchronization signal according to the dedicated indication information.

According to the D2D synchronization method, the user equipment, and the serving cell that are provided in the embodiments of the present invention, user equipment acquires synchronization control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization control information, whether to start to send a synchronization signal; and if it is determined to start to send a synchronization signal, the user equipment sends a second synchronization signal on a third transmission carrier frequency whose frequency is different from a frequency of a carrier frequency of the serving cell, where the second synchronization signal is used to instruct any user equipment on the third transmission carrier frequency to perform synchronization according to a synchronization signal sent by the user equipment, so that a problem of synchronization between different user equipments in a multi-carrier frequency transmission scenario can be resolved.

BRIEF DESCRIPTION OF DRAWINGS

To describe technical solutions in embodiments of the present invention more clearly, the following briefly describes the accompanying drawings. The accompanying drawings in the following description show merely some embodiments of the present invention, and a person of ordinary skill in the art may still derive other drawings from these accompanying drawings without creative efforts.

FIG. 10 is a schematic flowchart of still another D2D synchronization method according to an embodiment of the present invention;

FIG. 11 is a schematic flowchart of still another D2D synchronization method according to an embodiment of the present invention;

DESCRIPTION OF EMBODIMENTS

The following clearly describes technical solutions in embodiments of the present invention with reference to the accompanying. The described embodiments are merely some but not all of the embodiments of the present invention. All other embodiments obtained by a person of ordinary skill in the art based on the embodiments of the present invention without creative efforts shall fall within the protection scope of the present invention.

User equipment in the embodiments of the present invention needs to perform D2D communication with another user equipment on a dedicated transmission carrier frequency. Therefore, synchronization between the user equipments needs to be performed first. A frequency of the dedicated transmission carrier frequency is different from a frequency of a serving cell that serves the user equipment, and user equipments in more than one serving cell perform D2D communication on the dedicated transmission carrier frequency.

The user equipment in the present invention acquires synchronization control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization control information, whether to start to send a synchronization signal; and if it is determined to start to send a synchronization signal, the user equipment sends a second synchronization signal on a third transmission carrier frequency whose frequency is different from a frequency of a carrier frequency of the serving cell, where the second synchronization signal is used to instruct any user equipment on the third transmission carrier frequency to perform synchronization according to the synchronization signal sent by the user equipment, so that a problem of synchronization between different user equipments in a multi-carrier frequency transmission scenario can be resolved.

The following describes, in detail with reference to FIG. 2 to FIG. 11, a D2D synchronization method provided in the embodiments of the present invention.

Figure 1:
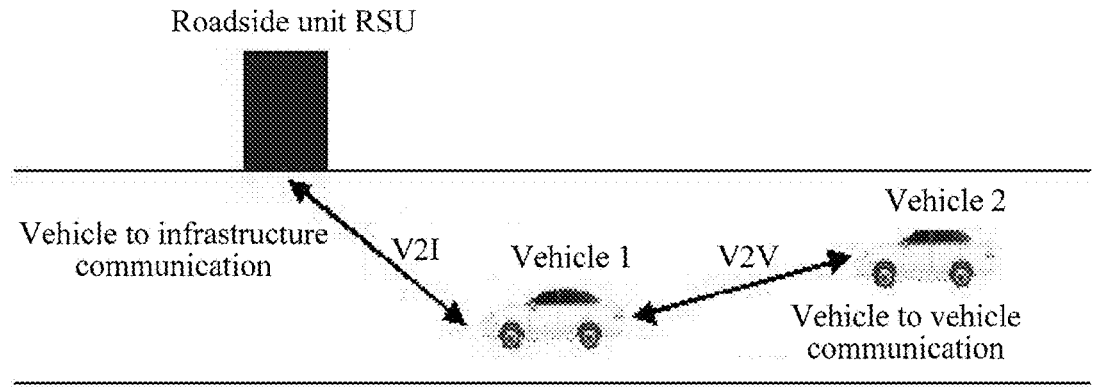
FIG. 1 is a schematic diagram of V2V/V2I communication.
Figure 2:
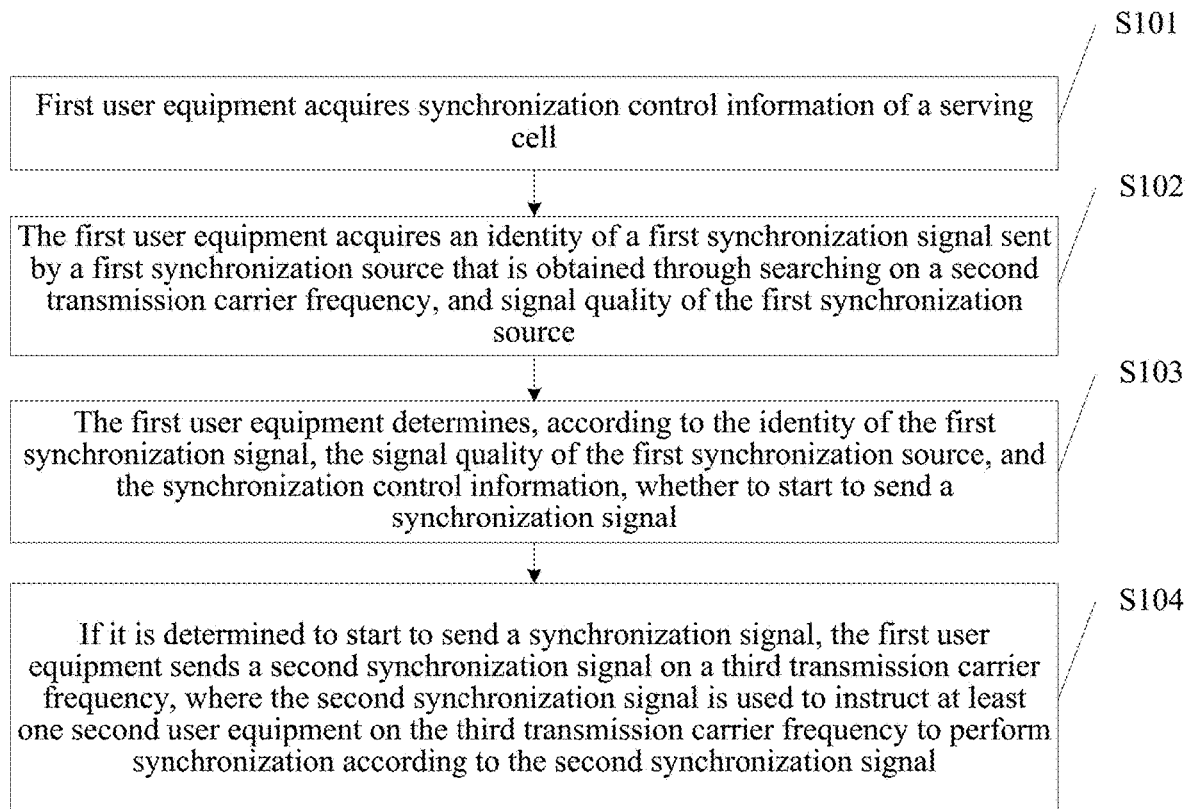
FIG. 2 is a schematic flowchart of a D2D synchronization method according to an embodiment of the present invention.

FIG. 2 is a schematic flowchart of a D2D synchronization method according to an embodiment of the present invention. The method includes the following steps:

Step S101: First user equipment acquires synchronization control information of a serving cell.

If user equipment needs to perform D2D communication on a dedicated transmission carrier frequency, the user equipment first needs to perform D2D synchronization, and a serving cell of the user equipment needs to control synchronization operation that is performed by the user equipment on the dedicated transmission carrier frequency. In this embodiment, a serving cell A of user equipment UE1 may send synchronization control information to the UE1, and the UE1 receives the synchronization control information of the serving cell A. The synchronization control information is used to indicate to the user equipment how to perform synchronization operation on the dedicated transmission carrier frequency. Herein, the UE1 is used as the first user equipment, the serving cell A is used as the serving cell of the UE1, the serving cell A is located on a first transmission carrier frequency, the dedicated transmission carrier frequency is a third transmission carrier frequency, and a frequency of the third transmission carrier frequency is different from a frequency of the first transmission carrier frequency.

The synchronization control information sent by the serving cell A to the UE1 includes a dedicated synchronization signal identity and a first preset threshold. In this embodiment, the UE1 acquires the synchronization control information by using preconfigured information, by receiving system broadcast information sent by the serving cell A, or by receiving Radio Resource Control (RRC) dedicated signaling sent by the serving cell A.

Step S102: The first user equipment acquires an identity of a first synchronization signal sent by a first synchronization source that is obtained through searching on a second transmission carrier frequency, and signal quality of the first synchronization source.

The UE1 searches for a synchronization signal on the determined second transmission carrier frequency.

The second transmission carrier frequency is a transmission carrier frequency on which a synchronization source may exist, where the synchronization source may provide a synchronization reference for a surrounding terminal to perform D2D communication on the third transmission carrier frequency. This embodiment does not limit a method for acquiring information about a frequency of the second transmission carrier frequency. Optionally, the UE1 may acquire the information about the frequency of the second transmission carrier frequency by using preconfigured information, by receiving system broadcast information sent by the serving cell A, or by receiving RRC dedicated signaling sent by the serving cell A. The frequency of the second transmission carrier frequency may be the same as or may be different from the frequency of the third transmission carrier frequency.

A synchronization source obtained by the UE1 through searching on the second transmission carrier frequency is referred to as the first synchronization source, and a synchronization signal sent by the synchronization source is referred to as the first synchronization signal. The UE1 acquires the first synchronization signal sent by the first synchronization source and obtains the signal quality of the first synchronization source through measurement. A specific searching method and signal measurement method are the same as the existing synchronization source searching manner and signal measurement manner, and details are not described herein.

Step S103: The first user equipment determines, according to the identity of the first synchronization signal, the signal quality of the first synchronization source, and the synchronization control information, whether to start to send a synchronization signal.

The UE1 compares whether the identity corresponding to the first synchronization signal of the first synchronization source obtained through searching is the same as the dedicated synchronization signal identity included in the synchronization control information, and compares the signal quality of the first synchronization source obtained through searching with the first preset threshold included in the synchronization control information, to determine whether to start to send a synchronization signal.

Generally, when the first synchronization source obtained by the UE1 through searching on the second transmission carrier frequency cannot provide a synchronization reference for user equipment surrounding the UE1 to perform D2D communication on the third transmission carrier frequency, the UE1 triggers starting to send a synchronization signal.

Step S104: If it is determined to start to send a synchronization signal, the first user equipment sends a second synchronization signal on a third transmission carrier frequency, where the second synchronization signal is used to instruct at least one second user equipment on the third transmission carrier frequency to perform synchronization according to the second synchronization signal.

According to the D2D synchronization method provided in this embodiment of the present invention, user equipment acquires synchronization control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization control information, whether to start to send a synchronization signal; and if it is determined to start to send a synchronization signal, the user equipment sends a second synchronization signal on a third transmission carrier frequency whose frequency is different from a frequency of a carrier frequency of the serving cell, where the second synchronization signal is used to instruct any neighboring user equipment on the third transmission carrier frequency to perform synchronization according to a synchronization signal sent by the user equipment, so that a problem of synchronization between different user equipments in a multi-carrier frequency transmission scenario can be resolved.

Figure 3:
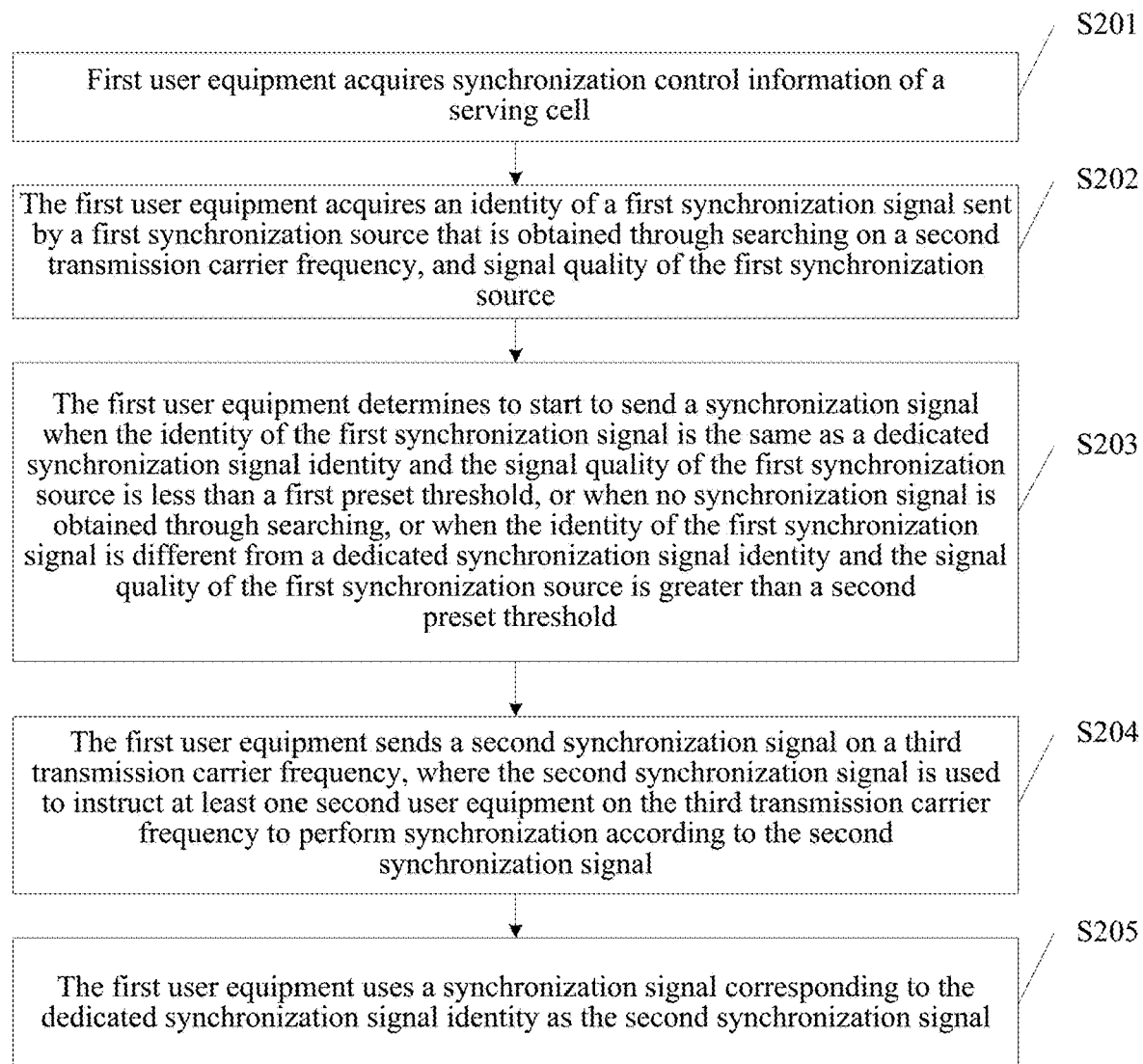
FIG. 3 is a schematic flowchart of another D2D synchronization method according to an embodiment of the present invention.

FIG. 3 is a schematic flowchart of another D2D synchronization method according to an embodiment of the present invention. The method includes the following steps:

Step S201: First user equipment acquires synchronization control information of a serving cell.

User equipment that performs D2D communication on a dedicated transmission carrier frequency, that is, a third transmission carrier frequency, may be located in network coverage of a serving cell A, or may be located on a network coverage edge of a serving cell A or out of network coverage of a serving cell A, or may belong to serving cells B and C, and may be located in network coverage of the serving cells B and C, or may be located on network coverage edges of the serving cells B and C or out of network coverage of the serving cells B and C. The serving cell A is used as the serving cell of the first user equipment UE1 and is located on a first transmission carrier frequency, and a frequency of the first transmission carrier frequency is different from a frequency of the third transmission carrier frequency.

The UE1, as the first user equipment, receives the synchronization control information sent by the serving cell A, where the synchronization control information includes a dedicated synchronization signal identity, and a first preset threshold and/or a second preset threshold.

Optionally, the dedicated synchronization signal identity may be a sidelink synchronization signal identity (SLSSID), and a synchronization signal corresponding to the dedicated synchronization signal identity may be a sidelink synchronization signal (SLSS). The sidelink synchronization signal includes a primary sidelink synchronization signal (PSSS) and a secondary sidelink synchronization signal (SSSS).

Optionally, the dedicated synchronization signal identity may also be a physical cell identity (PCI), a transmission carrier frequency identity, or a public land mobile network (PLMN) identity.

Optionally, when the dedicated synchronization signal identity is the physical cell identity (PCI), the transmission carrier frequency identity, or the PLMN identity, the synchronization control information may further include a sidelink synchronization signal identity corresponding to the dedicated synchronization signal identity.

Optionally, the synchronization control information may further include a third preset threshold.

Step S202: The first user equipment acquires an identity of a first synchronization signal sent by a first synchronization source that is obtained through searching on a second transmission carrier frequency, and signal quality of the first synchronization source.

The second transmission carrier frequency is a carrier frequency on which a synchronization source may exist, where the synchronization source may provide a synchronization reference for surrounding user equipment to perform D2D communication on the third transmission carrier frequency. This embodiment does not limit a method for acquiring, by the user equipment (UE), information about a frequency of the second transmission carrier frequency. Optionally, the UE may acquire the information about the frequency of the second transmission carrier frequency by using preconfigured information, by receiving system broadcast information sent by the serving cell, or by receiving RRC dedicated control signaling sent by the serving cell.

A synchronization source obtained by the UE1 through searching on the second transmission carrier frequency is referred to as the first synchronization source, and a synchronization signal sent by the synchronization source is referred to as the first synchronization signal. The UE1 acquires the first synchronization signal sent by the first synchronization source and obtains the signal quality of the first synchronization source through measurement. A specific searching method and signal measurement method are the same as the existing synchronization source searching and signal measurement method, and details are not described herein.

Step S203: When the identity of the first synchronization signal is the same as a dedicated synchronization signal identity and the signal quality of the first synchronization source is less than a first preset threshold, or when no synchronization signal is obtained through searching, or when the identity of the first synchronization signal is different from a dedicated synchronization signal identity and the signal quality of the first synchronization source is greater than a second preset threshold, the first user equipment determines to start to send a synchronization signal.

Specifically, when the identity of the first synchronization signal, the signal quality of the first synchronization source, and the synchronization control information satisfy any one of the following conditions, the UE1 determines to start to send a synchronization signal. The condition includes:

the identity of the first synchronization signal is the same as the dedicated synchronization signal identity and the signal quality of the first synchronization source is less than or equal to the first preset threshold; or the UE1 cannot obtain a synchronization signal of any synchronization source through searching; or the identity of the first synchronization signal is different from the dedicated synchronization signal identity and the signal quality of the first synchronization source is greater than the second preset threshold.

Optionally, when the synchronization control information further includes the third preset threshold, when the identity of the first synchronization signal, the signal quality of the first synchronization source, and the synchronization control information satisfy any one of the following conditions, the UE1 may determine to start to send a synchronization signal. The condition includes:

the identity of the first synchronization signal is the same as the dedicated synchronization signal identity, the signal quality of the first synchronization source is less than or equal to the first preset threshold, and signal quality of the serving cell A is greater than or equal to the third preset threshold; or the UE1 cannot obtain a synchronization signal of any synchronization source through searching and signal quality of the serving cell A is greater than or equal to the third preset threshold; or the identity of the first synchronization signal is different from the dedicated synchronization signal identity, the signal quality of the first synchronization source is greater than the second preset threshold, and signal quality of the serving cell A is greater than or equal to the third preset threshold.

Figure 4:
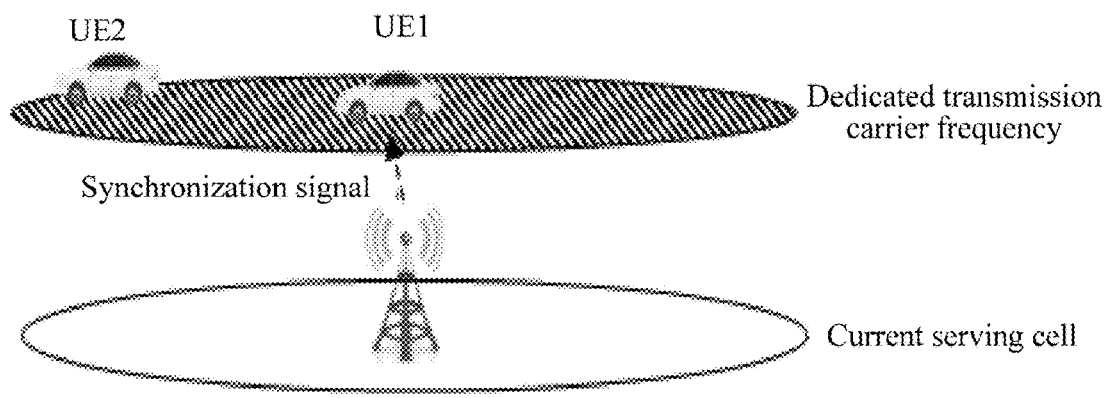
FIG. 4 is a schematic diagram of a D2D communication scenario involved in the embodiment shown in FIG. 3.

FIG. 4 is a schematic diagram of a D2D communication scenario. UE1 and UE2 are user equipments served by the serving cell A, the UE1 expects to perform D2D communication on a dedicated transmission carrier frequency, and the UE2 is located in coverage of the serving cell A and is used as a synchronization source to send a first synchronization signal. The UE1 searches on the dedicated transmission carrier frequency, that is, the second transmission carrier frequency, and obtains the first synchronization signal sent by the UE2. The UE1 acquires the identity of the first synchronization signal, and determines through comparison that the identity of the first synchronization signal is the same as the dedicated synchronization signal identity in the synchronization control information, which represents that the UE2 is a synchronization source that is allowed by the serving cell A to provide a synchronization reference for the D2D communication performed on the dedicated transmission carrier frequency. In addition, signal quality of the UE2 is less than the first preset threshold in the synchronization control information, which represents that the UE2 is relatively far away from the UE1. Therefore, the UE2 cannot better provide a synchronization reference for user equipment surrounding the UE1 to perform D2D communication on the dedicated transmission carrier frequency. In this case, the UE1 determines to send a synchronization signal, so as to provide a synchronization reference for surrounding user equipment to perform D2D communication on the dedicated transmission carrier frequency.

Step S204: The first user equipment sends a second synchronization signal on a third transmission carrier frequency, where the second synchronization signal is used to instruct at least one second user equipment on the third transmission carrier frequency to perform synchronization according to the second synchronization signal.

Step S205: The first user equipment uses a synchronization signal corresponding to the dedicated synchronization signal identity as the second synchronization signal.

Optionally, when the dedicated synchronization signal identity is the SLSSID, the second synchronization signal is a sidelink synchronization signal corresponding to the dedicated synchronization signal identity.

Optionally, when the dedicated synchronization signal identity is the PCI, the transmission carrier frequency identity, or the PLMN identity, the second synchronization signal is a sidelink synchronization signal corresponding to the dedicated synchronization signal identity, where a correspondence between the dedicated synchronization signal identity and the sidelink synchronization signal may be included in the synchronization control information. For example, the synchronization control information includes a dedicated synchronization signal identity PCI1 and a corresponding dedicated sidelink synchronization signal identity SLSSID1, and when the UE1 detects on the second transmission carrier frequency that the first synchronization signal is the PCI1, if it is determined to send a synchronization signal, the UE1 uses a sidelink synchronization signal corresponding to the SLSSID1 as the second synchronization signal and sends the second synchronization signal on the third transmission carrier frequency.

For the D2D communication scenario shown in FIG. 4, after determining to send a synchronization signal, the UE1 sends, on the third transmission carrier frequency, the sidelink synchronization signal corresponding to the dedicated synchronization signal identity, so that neighboring user equipment on the third transmission carrier frequency can perform synchronization according to the synchronization signal sent by the UE1.

Optionally, in an alternative manner of step S205, after the determining, by the first user equipment, to start to send a synchronization signal, the method further includes:

sending, by the first user equipment, the identity of the first synchronization signal and the signal quality of the first synchronization source to the serving cell;

receiving, by the first user equipment, dedicated indication information sent by the serving cell; and using, by the first user equipment, a synchronization signal corresponding to the dedicated synchronization signal identity as the second synchronization signal according to the dedicated indication information.

That is, the serving cell determines the first synchronization source or selects the first synchronization source from multiple first synchronization sources according to the identity of the first synchronization signal and the signal quality of the first synchronization source, instructing the first user equipment to use the synchronization signal corresponding to the dedicated synchronization signal identity as the second synchronization signal.

The dedicated indication information may be start indication information or a synchronization signal identity.

When the dedicated indication information is the start indication information, the first user equipment uses the synchronization signal corresponding to the dedicated synchronization signal identity in the synchronization control information as the second synchronization signal.

When the dedicated indication information is the synchronization signal identity, a synchronization signal corresponding to the dedicated indication information is used as the second synchronization signal.

It should be noted that, in this embodiment, a synchronization clock of the UE1 needs to be aligned with a synchronization clock of the serving cell A or with a synchronization clock of a synchronization source whose synchronization signal identity is the dedicated synchronization signal identity. A specific clock synchronization method belongs to the prior art, and details are not described herein.

According to the D2D synchronization method provided in this embodiment of the present invention, user equipment acquires synchronization control information of a serving cell; acquires an identity of a first synchronization signal sent by a first synchronization source that is obtained through searching on a second transmission carrier frequency, and signal quality of the first synchronization source; determines to start to send a synchronization signal when a synchronization signal sent by a synchronization source whose synchronization signal identity is the same as a dedicated synchronization signal identity is obtained through searching but signal quality of the synchronization source obtained through searching is less than or equal to a preset threshold, or when no synchronization signal sent by any synchronization source is obtained through searching, or although signal quality of a synchronization source obtained through searching is greater than a preset threshold, a synchronization signal identity of the synchronization source is different from a dedicated synchronization signal identity; and if it is determined to start to send a synchronization signal, uses a synchronization signal corresponding to the dedicated synchronization signal identity as a second synchronization signal, and the user equipment sends the second synchronization signal on a third transmission carrier frequency whose frequency is different from a frequency of a carrier frequency of the serving cell, where the second synchronization signal is used to instruct any user equipment on the third transmission carrier frequency to perform synchronization according to the second synchronization signal sent by the user equipment, so that a problem of synchronization between different user equipments in a multi-carrier frequency transmission scenario can be resolved.

Figure 5:
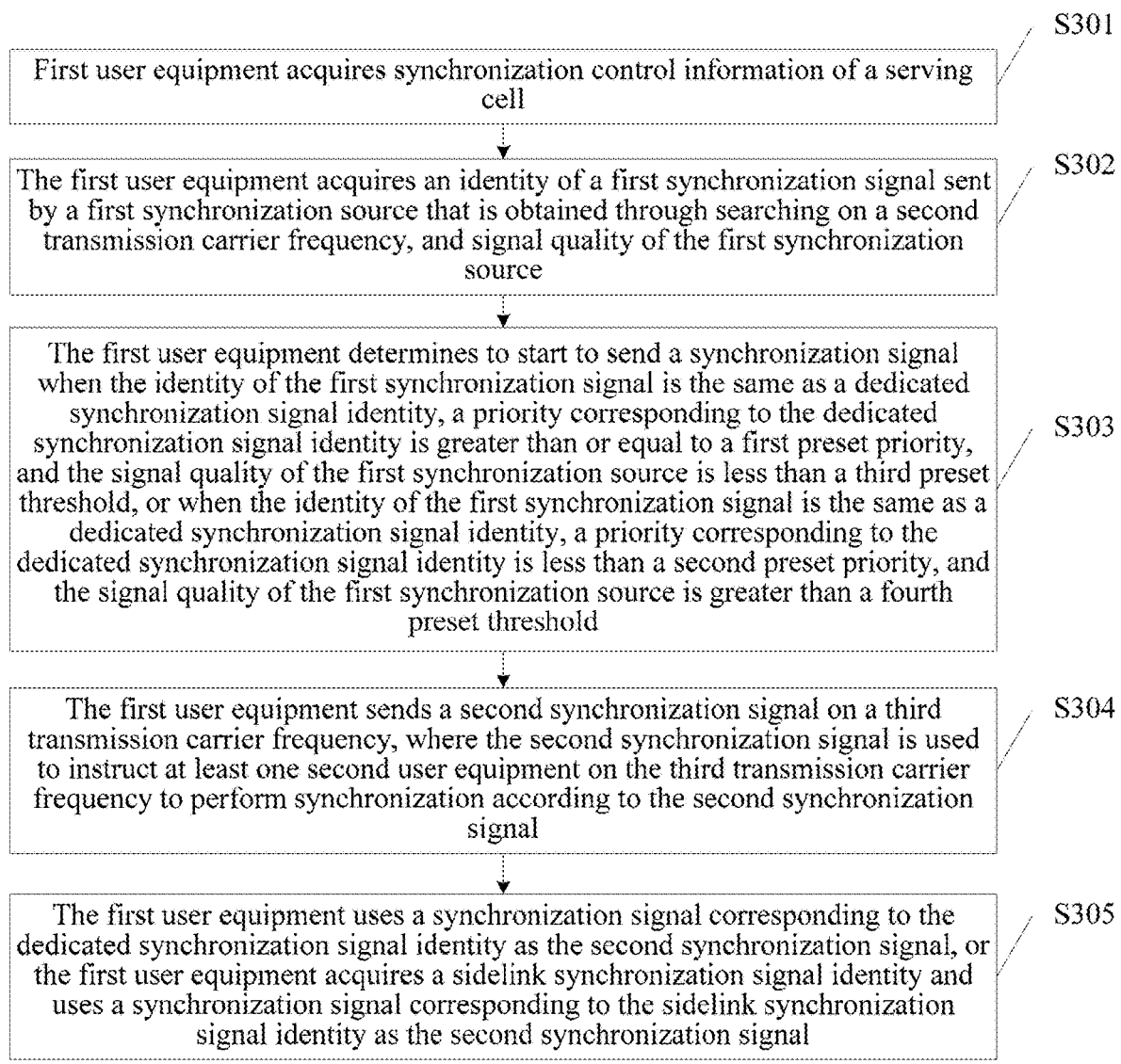
FIG. 5 is a schematic flowchart of still another D2D synchronization method according to an embodiment of the present invention.

FIG. 5 is a schematic flowchart of still another D2D synchronization method according to an embodiment of the present invention. The method includes the following steps:

Step S301: First user equipment acquires synchronization control information of a serving cell.

A serving cell A is used as the serving cell of the first user equipment UE1 and is located on a first transmission carrier frequency, and the serving cell A provides a network service for the first user equipment UE1. The UE1 receives the synchronization control information sent by the serving cell A, where the synchronization control information includes at least: a dedicated synchronization signal identity, a priority corresponding to the dedicated synchronization signal identity, a first preset threshold and/or a second preset threshold, and a first preset priority.

Optionally, the synchronization control information may include multiple dedicated synchronization signal identities, and each dedicated synchronization signal identity has a one-to-one corresponding priority and a corresponding first preset threshold.

Optionally, the dedicated synchronization signal identity may be a sidelink synchronization signal identity (SLSSID), a physical cell identity (PCI), a transmission carrier frequency identity, or a public land mobile network (PLMN) identity.

Optionally, when the dedicated synchronization signal identity is the physical cell identity (PCI), the transmission carrier frequency identity, or the PLMN identity, the synchronization control information may further include a sidelink synchronization signal identity corresponding to the dedicated synchronization signal identity.

Optionally, the synchronization control information may further include a third preset threshold.

Step S302: The first user equipment acquires an identity of a first synchronization signal sent by a first synchronization source that is obtained through searching on a second transmission carrier frequency, and signal quality of the first synchronization source.

The UE1 searches for and detects, on the second transmission carrier frequency, the first synchronization signal sent by the first synchronization source, and acquires the identity of the first synchronization signal and the signal quality of the first synchronization source.

Step S302 is the same as step S102 in the embodiment shown in FIG. 2 or step S202 in the embodiment shown in FIG. 3, and details are not described herein again.

Step S303: The first user equipment determines to start to send a synchronization signal when the identity of the first synchronization signal is the same as a dedicated synchronization signal identity, a priority corresponding to the dedicated synchronization signal identity is greater than or equal to a first preset priority, and the signal quality of the first synchronization source is less than a third preset threshold, or when the identity of the first synchronization signal is the same as a dedicated synchronization signal identity, a priority corresponding to the dedicated synchronization signal identity is less than a second preset priority, and the signal quality of the first synchronization source is greater than a fourth preset threshold.

Specifically, when any one of the following conditions is satisfied, the UE1 determines to start to send a synchronization signal. The condition includes:

the identity of the first synchronization signal is the same as the dedicated synchronization signal identity, the priority corresponding to the dedicated synchronization signal identity is greater than or equal to the first preset priority, and the signal quality of the first synchronization source is less than the first preset threshold; or the identity of the first synchronization signal is the same as the dedicated synchronization signal identity, the priority corresponding to the dedicated synchronization signal identity is less than the first preset priority, and the signal quality of the first synchronization source is greater than or equal to the second preset threshold; or the UE1 cannot obtain a synchronization signal of any synchronization source through searching.

Optionally, when the synchronization control information includes the third preset threshold, when the identity of the first synchronization signal, the signal quality of the first synchronization source, and the synchronization control information satisfy any one of the following conditions, the UE1 may determine to start to send a synchronization signal. The condition includes:

the identity of the first synchronization signal is the same as the dedicated synchronization signal identity, the priority corresponding to the dedicated synchronization signal identity is greater than or equal to the first preset priority, the signal quality of the first synchronization source is less than the first preset threshold, and signal quality of the serving cell A is greater than or equal to the third preset threshold; or the identity of the first synchronization signal is the same as the dedicated synchronization signal identity, the priority corresponding to the dedicated synchronization signal identity is less than the first preset priority, the signal quality of the first synchronization source is greater than or equal to the second preset threshold, and signal quality of the serving cell A is greater than or equal to the third preset threshold; or the UE1 cannot obtain a synchronization signal of any synchronization source through searching and signal quality of the serving cell A is greater than or equal to the third preset threshold.

Step S304: The first user equipment sends a second synchronization signal on a third transmission carrier frequency, where the second synchronization signal is used to instruct at least one second user equipment on the third transmission carrier frequency to perform synchronization according to the second synchronization signal.

Step S305: The first user equipment uses a synchronization signal corresponding to the dedicated synchronization signal identity as the second synchronization signal, or the first user equipment acquires a sidelink synchronization signal identity and uses a synchronization signal corresponding to the sidelink synchronization signal identity as the second synchronization signal.

Optionally, when the dedicated synchronization signal identity is the SLSSID, the second synchronization signal is a sidelink synchronization signal corresponding to the dedicated synchronization signal identity.

Optionally, when the dedicated synchronization signal identity is the PCI, the transmission carrier frequency identity, or the PLMN identity, the second synchronization signal is a synchronization signal corresponding to a sidelink synchronization identity corresponding to the dedicated synchronization signal identity, where the sidelink synchronization signal identity corresponding to the dedicated synchronization signal identity may be included in the synchronization control information. For example, the synchronization control information includes a dedicated synchronization signal identity PCI1 and a corresponding dedicated sidelink synchronization signal identity SLSSID1, and when the UE1 detects on the second transmission carrier frequency that the first synchronization signal is the PCI1, if it is determined to send a synchronization signal, the UE1 uses a sidelink synchronization signal corresponding to the SLSSID1 as the second synchronization signal and sends the second synchronization signal on the third transmission carrier frequency.

Optionally, when the synchronization control information includes multiple dedicated synchronization signal identities and the UE1 detects, on at least one second transmission carrier frequency, multiple first synchronization sources that satisfy conditions of starting to send a synchronization signal, the UE1 may determine a synchronization source with a highest priority corresponding to a synchronization signal identity in the first synchronization sources, and use a sidelink synchronization signal corresponding to the synchronization source as the second synchronization signal. If the identity of the first synchronization signal obtained through searching is the same as the dedicated synchronization signal identity, the first synchronization signal has a priority the same as a priority corresponding to the dedicated synchronization signal identity, and therefore, the priority of the first synchronization source is known.

In an alternative manner of step S305, after the determining, by the first user equipment, to start to send a synchronization signal, the method further includes:

sending, by the first user equipment, the identity of the first synchronization signal and the signal quality of the first synchronization source to the serving cell;

receiving, by the first user equipment, dedicated indication information sent by the serving cell; and using, by the first user equipment, a synchronization signal corresponding to the dedicated synchronization signal identity as the second synchronization signal according to the dedicated indication information.

That is, the serving cell determines the first synchronization source or selects the first synchronization source from multiple first synchronization sources according to the identity of the first synchronization signal and the signal quality of the first synchronization source, instructing the first user equipment to use the synchronization signal corresponding to the dedicated synchronization signal identity as the second synchronization signal.

The dedicated indication information may be start indication information or a synchronization signal identity.

When the dedicated indication information is the start indication information, the first user equipment uses the synchronization signal corresponding to the dedicated synchronization signal identity in the synchronization control information as the second synchronization signal.

When the dedicated indication information is the synchronization signal identity, a synchronization signal corresponding to the dedicated indication information is used as the second synchronization signal.

Figure 6:
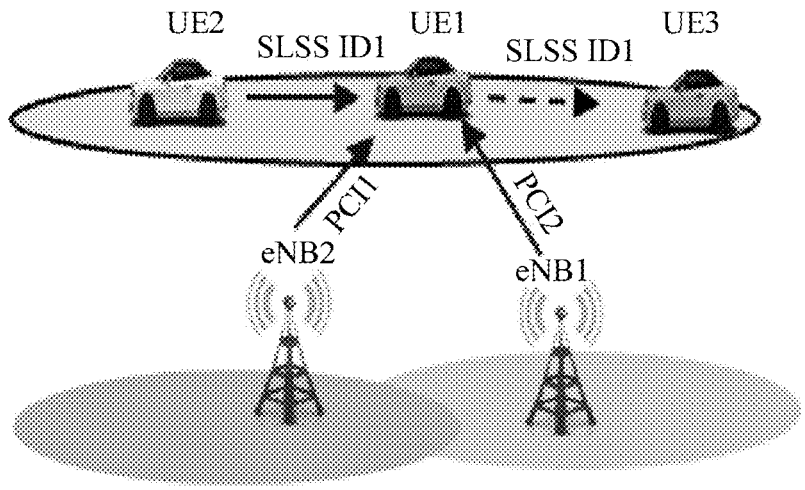
FIG. 6 is a schematic diagram of another D2D communication scenario involved in the embodiment shown in FIG. 5.

FIG. 6 is a schematic diagram of another D2D communication scenario. UE1 receives synchronization control information sent by an Evolved Node B eNB2, where the synchronization control information includes multiple dedicated synchronization signal identities, a priority corresponding to each dedicated synchronization signal identity, a preset priority, and second and third signal quality thresholds. A corresponding preset signal quality threshold is set according to whether a type of a synchronization source is terminal or serving cell, the second preset signal quality threshold is used to measure whether signal quality of a synchronization signal of a terminal satisfies a requirement, and the third preset signal quality threshold is used to measure whether signal quality of a synchronization signal of a serving cell satisfies a requirement. Certainly, the second preset signal quality threshold may be equal to the third preset signal quality threshold, and in this case, the two parameters may be one parameter. Priorities corresponding to dedicated synchronization signal identities may be different. Therefore, there is a sequence of priorities.

In FIG. 6, base stations in serving cells of the UE1 and UE2 are the eNB2, and a base station in a serving cell of UE3 is an eNB1. The UE2, the eNB1, and the eNB2 may all be used as synchronization sources of the third transmission carrier frequency. When the UE2, the eNB1, and the eNB2 are used as synchronization sources, an identity ID corresponding to a synchronization signal sent by the UE2 is an SLSSID1, an identity of a synchronization signal sent by the eNB2 is a PCI1, and a synchronization signal sent by the eNB1 is a PCI2. Priorities of the three synchronization sources or priorities of synchronization signals sent by the synchronization sources are sequenced: SLSSID1>PCI2>PCI1. Certainly, because only a priority corresponding to the dedicated synchronization signal identity is configured, the priority of the first synchronization signal can be obtained only when the identity of the first synchronization signal is the same as the dedicated synchronization signal identity. Certainly, there may be multiple dedicated synchronization signal identities, for example, herein, the dedicated synchronization signal identities include the SLSSID1, the PCI2, and the PCI1. Herein, the preset priority is a priority corresponding to the PCI1.

Using FIG. 6 as an example, the eNB2 sends the synchronization control information to the UE1, where the synchronization control information includes multiple dedicated synchronization signal identities, that is, the SLSSID1, the PCI1, the PCI2, priorities corresponding to the dedicated synchronization signal identities, and a sequence between the priorities. In addition, two signal quality thresholds thresh1 and the thresh2 are specified, to separately determine whether signal quality of a terminal-type synchronization source and signal quality of a base station-type or a serving cell-type synchronization source satisfy the signal quality threshold. The UE1 receives the synchronization control information. The synchronization control information may further carry an adaptive synchronization start instruction, and the UE1 performs the following steps only after the synchronization control information carries the adaptive synchronization start instruction.

The UE1 searches for a synchronization signal on the second transmission carrier frequency. There are three second transmission carrier frequencies, namely, a dedicated transmission carrier frequency, a transmission carrier frequency of the eNB1, and a transmission carrier frequency of the eNB2. The UE1 obtains different synchronization sources through searching on different second transmission carrier frequencies. That is, after searching, the UE1 obtains a terminal-type synchronization source UE2 through searching on the dedicated transmission carrier frequency, an identity of a synchronization signal sent by the UE2 is the SLSSID1, and signal quality is less than the thresh1. In addition, the UE1 obtains a base station-type synchronization source eNB1 through searching on a second transmission carrier frequency, a synchronization identity sent by the eNB1 is the PCI2, and signal quality is less than thresh2. In addition, the UE1 obtains a base station-type synchronization source eNB2 through searching on another second transmission carrier frequency, a synchronization identity sent by the eNB2 is the PCI1, and signal quality is less than thresh2. The UE1 finds according to the synchronization control information that synchronization priorities of the UE2 and the eNB1 both are higher than a priority of the identity PCI1 of the synchronization signal of the serving cell eNB2 of the UE1. However, signal quality of synchronization signals having high priorities both cannot satisfy a requirement. In this case, the UE1 needs to send a synchronization signal on the third transmission carrier frequency, and an identity, that is, the SLSSID1, having a highest priority in the multiple dedicated synchronization signal identities is used as the identity of the sent synchronization signal.

Another UE on the third transmission carrier frequency searches for a synchronization source on a specified transmission carrier frequency according to synchronization source detection control information sent by a serving cell of the UE; if a synchronization signal identity of the synchronization source obtained through searching is the same as the dedicated synchronization signal identity and signal quality of the synchronization source is greater than a preset signal quality threshold, determines that the synchronization source is a candidate synchronization source; and when multiple candidate synchronization sources are determined, determines that a synchronization source with a highest priority corresponding to a synchronization signal identity in the multiple candidate synchronization sources is a synchronization source that performs D2D communication on the third transmission carrier frequency.

According to the D2D synchronization method provided in this embodiment of the present invention, user equipment acquires synchronization control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization control information, whether to start to send a synchronization signal; and if it is determined to start to send a synchronization signal, the user equipment sends a second synchronization signal on a third transmission carrier frequency whose frequency is different from a frequency of a carrier frequency of the serving cell, where the second synchronization signal is used to instruct any user equipment on the third transmission carrier frequency to select a synchronization signal that has a highest priority and whose signal quality satisfies a condition, to perform synchronization, so that a problem of synchronization between different user equipments in a multi-carrier frequency transmission scenario can be resolved.

Figure 7:
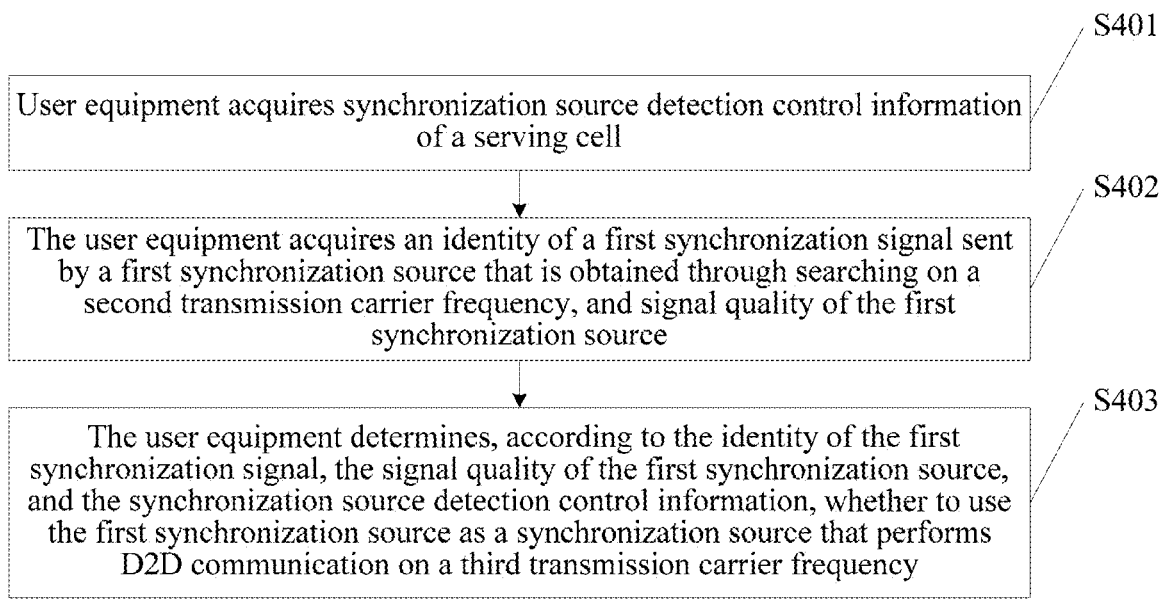
FIG. 7 is a schematic flowchart of still another D2D synchronization method according to an embodiment of the present invention.

FIG. 7 is a schematic flowchart of still another D2D synchronization method according to an embodiment of the present invention. The method includes the following steps:

Step S401: User equipment acquires synchronization source detection control information of a serving cell, where the serving cell is located on a first transmission carrier frequency.

If the user equipment needs to perform D2D communication on a dedicated transmission carrier frequency, that is, a third transmission carrier frequency, the user equipment first needs to perform D2D synchronization, and the serving cell of the user equipment needs to control synchronization operation that is performed by the user equipment on the dedicated transmission carrier frequency. In this embodiment, a serving cell B of user equipment UE2 may send synchronization source detection control information to the UE2, and the UE2 receives the synchronization source detection control information of the serving cell B. The synchronization source detection control information is used to indicate a condition that a synchronization source choosing to perform D2D communication on the dedicated transmission carrier frequency needs to satisfy. The UE2 is used as the user equipment in this embodiment, the serving cell B is used as the serving cell of the user equipment UE2, the serving cell B is located on the first transmission carrier frequency, the dedicated transmission carrier frequency is the third transmission carrier frequency, and a frequency of the third transmission carrier frequency is different from a frequency of the first transmission carrier frequency.

The synchronization source detection control information sent by the serving cell B to the UE2 includes a dedicated synchronization signal identity and a first preset threshold. In this embodiment, the UE2 acquires the synchronization source detection control information by using preconfigured information, by receiving system broadcast information sent by the serving cell B, or by receiving RRC dedicated signaling sent by the serving cell B.

Step S402: The user equipment acquires an identity of a first synchronization signal sent by a first synchronization source that is obtained through searching on a second transmission carrier frequency, and signal quality of the first synchronization source.

Step S403: The user equipment determines, according to the identity of the first synchronization signal, the signal quality of the first synchronization source, and the synchronization source detection control information, whether to use the first synchronization source as a synchronization source that performs D2D communication on a third transmission carrier frequency, where a frequency of the third transmission carrier frequency is different from a frequency of the first transmission carrier frequency.

The UE2 searches for a synchronization signal on the determined second transmission carrier frequency.

The second transmission carrier frequency is a transmission carrier frequency on which a synchronization source may exist, where the synchronization source may provide a synchronization reference for a surrounding terminal to perform D2D communication on the third transmission carrier frequency. This embodiment does not limit a method for acquiring information about a frequency of the second transmission carrier frequency. Optionally, the UE2 may acquire the information about the frequency of the second transmission carrier frequency by using preconfigured information, by receiving system broadcast information sent by the serving cell B, or by receiving RRC dedicated signaling sent by the serving cell B. The frequency of the second transmission carrier frequency may be the same as or may be different from the frequency of the third transmission carrier frequency.

A synchronization source obtained by the UE2 through searching on the second transmission carrier frequency is referred to as the first synchronization source, and a synchronization signal sent by the synchronization source is referred to as the first synchronization signal. The UE2 acquires the first synchronization signal sent by the first synchronization source and obtains the signal quality of the first synchronization source through measurement. A specific searching method and signal measurement method are the same as the existing synchronization source searching manner and signal measurement manner, and details are not described herein.

The UE2 compares whether the identity of the first synchronization signal is the same as the dedicated signal identity in the synchronization source detection control information and whether the signal quality of the first synchronization source is greater than the first preset threshold in the synchronization source detection control information, to determine whether the first synchronization source can be used as the synchronization source that performs D2D communication on the third transmission carrier frequency.

According to the D2D synchronization method provided in this embodiment of the present invention, user equipment acquires synchronization source detection control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization source detection control information, whether to use the first synchronization source as a synchronization source that performs D2D communication on a third transmission carrier frequency whose frequency is different from a frequency of a carrier frequency of the serving cell, to perform D2D communication according to the determined synchronization source.

Figure 8:
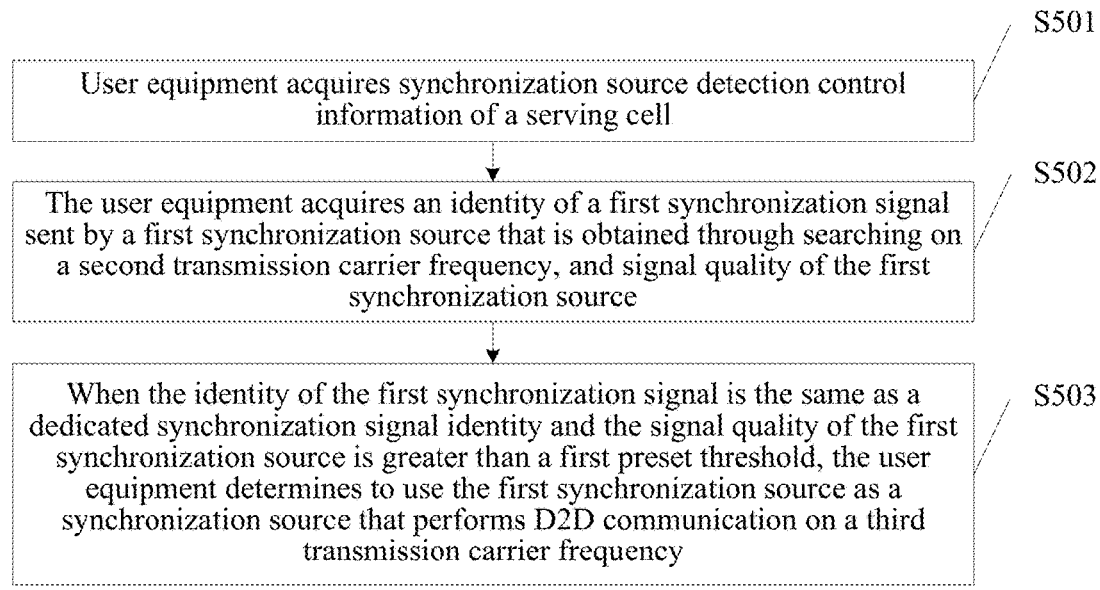
FIG. 8 is a schematic flowchart of still another D2D synchronization method according to an embodiment of the present invention.

FIG. 8 is a schematic flowchart of still another D2D synchronization method according to an embodiment of the present invention. The method includes the following steps:

Step S501: User equipment acquires synchronization source detection control information of a serving cell.

UE2, as the user equipment in this embodiment, receives the synchronization source detection control information sent by a serving cell B. The serving cell B is used as the serving cell of the user equipment UE2, and the synchronization source detection control information includes a dedicated synchronization signal identity and a first preset threshold.

Optionally, the dedicated synchronization signal identity may be an SLSSID, and a synchronization signal corresponding to the dedicated synchronization signal identity may be an SLSS. The sidelink synchronization signal includes a PSSS and an SSSS.

Optionally, the dedicated synchronization signal identity may be a PCI, a transmission carrier frequency identity, or a PLMN identity.

Step S502: The user equipment acquires an identity of a first synchronization signal sent by a first synchronization source that is obtained through searching on a second transmission carrier frequency, and signal quality of the first synchronization source.

The second transmission carrier frequency is a carrier frequency on which a synchronization source may exist, where the synchronization source may provide a synchronization reference for surrounding user equipment to perform D2D communication on a third transmission carrier frequency.

This embodiment does not limit a method for acquiring, by the UE, information about a frequency of the second transmission carrier frequency. Optionally, the UE may acquire the information about the frequency of the second transmission carrier frequency by using preconfigured information, by receiving system broadcast information sent by the serving cell, or by receiving RRC dedicated control signaling sent by the serving cell.

A synchronization source obtained by the UE2 through searching on the second transmission carrier frequency is referred to as the first synchronization source, and the UE2 acquires the first synchronization signal sent by the first synchronization source and obtains the signal quality of the first synchronization source through measurement. A specific searching method and signal measurement method are the same as the existing synchronization source searching and signal measurement method, and details are not described herein.

Step S503: When the identity of the first synchronization signal is the same as a dedicated synchronization signal identity and the signal quality of the first synchronization source is greater than a first preset threshold, the user equipment determines to use the first synchronization source as a synchronization source that performs D2D communication on a third transmission carrier frequency.

When the identity of the first synchronization signal obtained through searching is the same as the dedicated synchronization signal identity and the signal quality of the first synchronization source is greater than the preset threshold, it is determined to use the first synchronization source as the synchronization source that performs D2D communication on the third transmission carrier frequency. A frequency of a fourth transmission carrier frequency is different from a frequency of the third transmission carrier frequency.

According to the D2D synchronization method provided in this embodiment of the present invention, user equipment acquires synchronization source detection control information of a serving cell, acquires an identity of a first synchronization signal sent by a first synchronization source that is obtained through searching on a second transmission carrier frequency, and signal quality of the first synchronization source, and when the identity of the first synchronization signal is the same as a dedicated synchronization signal identity and the signal quality of the first synchronization source is greater than a first preset threshold, determines to use the first synchronization source as a synchronization source that performs D2D communication on a third transmission carrier frequency whose frequency is different from a frequency of a carrier frequency of the serving cell, to perform D2D communication according to the determined synchronization source.

Figure 9:
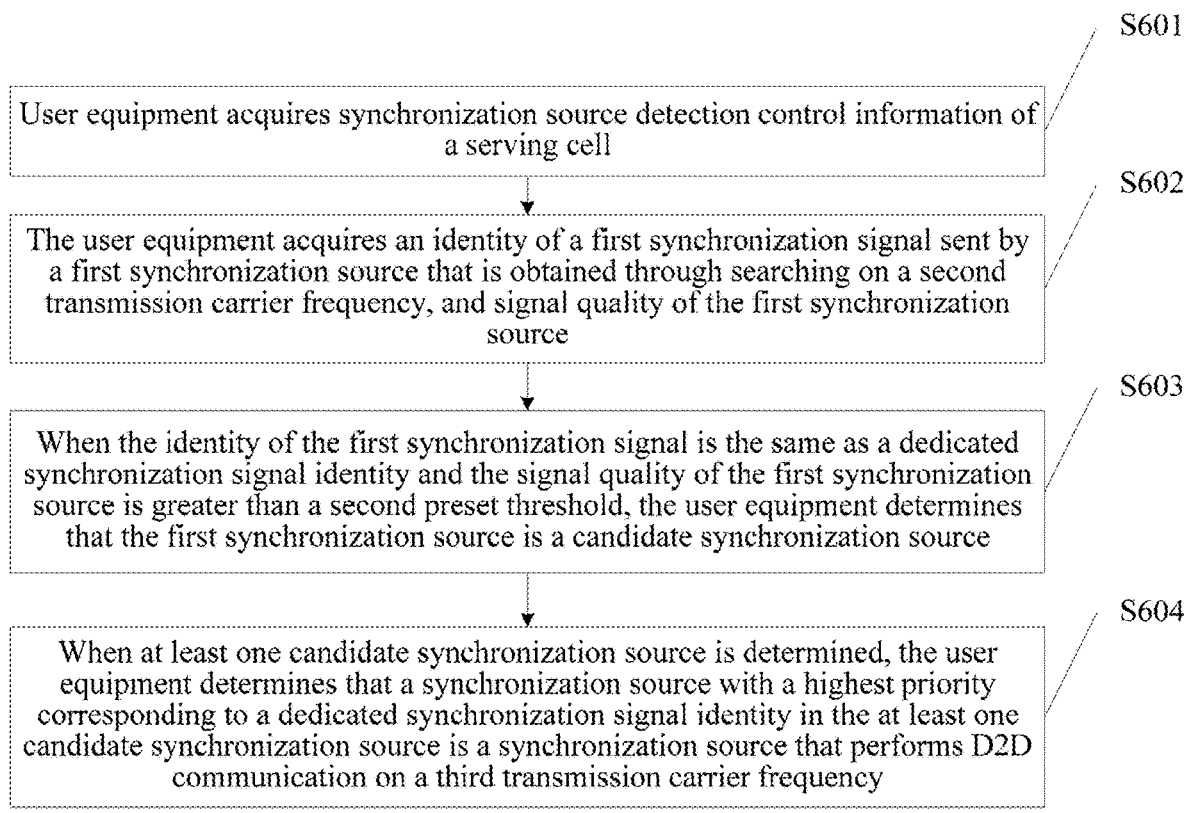
FIG. 9 is a schematic flowchart of still another D2D synchronization method according to an embodiment of the present invention.

FIG. 9 is a schematic flowchart of still another D2D synchronization method according to an embodiment of the present invention. The method includes the following steps:

Step S601: User equipment acquires synchronization source detection control information of a serving cell.

A serving cell B is used as a serving cell of user equipment UE2 and is located on a first transmission carrier frequency, and the serving cell B provides a network service for the second user equipment UE2. The UE2 receives the synchronization source detection control information sent by the serving cell B, and the synchronization source detection control information includes a dedicated synchronization signal identity, a priority corresponding to the dedicated synchronization signal identity, and a second preset threshold.

Optionally, the synchronization source detection control information may include multiple dedicated synchronization signal identities, and each dedicated synchronization signal identity has a one-to-one corresponding priority and a corresponding second preset threshold.

Optionally, the dedicated synchronization signal identity may be an SLSSID, a PCI, a transmission carrier frequency identity, or a PLMN identity.

Step S602: The user equipment acquires an identity of a first synchronization signal sent by a first synchronization source that is obtained through searching on a second transmission carrier frequency, and signal quality of the first synchronization source.

Step S602 is the same as step S502 in the embodiment shown in FIG. 8, and details are not described herein again.

Step S603: When the identity of the first synchronization signal is the same as a dedicated synchronization signal identity and the signal quality of the first synchronization source is greater than a second preset threshold, the user equipment determines that the first synchronization source is a candidate synchronization source.

As described above, the synchronization source detection control information may include multiple dedicated synchronization signal identities, and each dedicated synchronization signal identity has a one-to-one corresponding priority and a corresponding second preset threshold. When multiple first synchronization signals are obtained through searching, identities of the multiple first synchronization signals are respectively the same as the dedicated synchronization signal identities, and the signal quality of the first synchronization source is greater than the corresponding second preset threshold, it is determined that the first synchronization source is a candidate synchronization source, to determine multiple candidate synchronization sources.

Step S604: When at least one candidate synchronization source is determined, the user equipment determines that a synchronization source with a highest priority corresponding to a dedicated synchronization signal identity in the at least one candidate synchronization source is a synchronization source that performs D2D communication on a third transmission carrier frequency.

When the synchronization source that performs D2D communication on the third transmission carrier frequency is finally determined, it is determined that a synchronization source with a highest priority corresponding to a dedicated synchronization signal identity in the multiple candidate synchronization sources is the synchronization source that performs D2D communication on the third transmission carrier frequency. A frequency of a fourth transmission carrier frequency is different from a frequency of the third transmission carrier frequency.

According to the D2D synchronization method provided in this embodiment of the present invention, user equipment acquires synchronization source detection control information of a serving cell, acquires an identity of a first synchronization signal sent by a first synchronization source that is obtained through searching on a second transmission carrier frequency, and signal quality of the first synchronization source, and when the identity of the first synchronization signal is the same as a dedicated synchronization signal identity and the signal quality of the first synchronization source is greater than a second preset threshold, determines that the first synchronization source is a candidate synchronization source, and determines that a synchronization source with a highest priority corresponding to a dedicated synchronization signal identity in at least one candidate synchronization source is a synchronization source that performs D2D communication on a third transmission carrier frequency whose frequency is different from a frequency of a carrier frequency of the serving cell, to perform D2D communication according to the determined synchronization source.

FIG. 10 is a schematic flowchart of still another D2D synchronization method according to an embodiment of the present invention. The method includes the following steps:

Step S701: A serving cell sends synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and determine, according to the identity of the first synchronization signal and the signal quality of the first synchronization source, whether to send a second synchronization signal on a third transmission carrier frequency, the serving cell is located on a first transmission carrier frequency, and a frequency of the first transmission carrier frequency is different from a frequency of the third transmission carrier frequency.

If user equipment needs to perform D2D communication on a dedicated transmission carrier frequency, a serving cell of the user equipment needs to control synchronization operation that is performed by the user equipment on the dedicated transmission carrier frequency. In this embodiment, a serving cell A of user equipment UE1 may send synchronization control information to the UE1, and the UE1 receives the synchronization control information of the serving cell A. The synchronization control information is used to indicate to the user equipment how to perform synchronization operation on the dedicated transmission carrier frequency. UE1 is used as the first user equipment, the serving cell A is used as the serving cell of the UE1, the serving cell A is located on a first transmission carrier frequency, the dedicated transmission carrier frequency is the third transmission carrier frequency, and the frequency of the third transmission carrier frequency is different from the frequency of the first transmission carrier frequency.

The synchronization control information sent by the serving cell A to the UE1 includes a dedicated synchronization signal identity and a first preset threshold. In this embodiment, the UE1 acquires the synchronization control information by using preconfigured information, by receiving system broadcast information sent by the serving cell A, or by receiving RRC dedicated signaling sent by the serving cell A.

The UE1 searches for a synchronization signal on the determined second transmission carrier frequency.

The second transmission carrier frequency is a transmission carrier frequency on which a synchronization source may exist, where the synchronization source may provide a synchronization reference for a surrounding terminal to perform D2D communication on the third transmission carrier frequency. This embodiment does not limit a method for acquiring the second transmission carrier frequency. Optionally, the UE1 may acquire a frequency of the second transmission carrier frequency by using preconfigured information, by receiving system broadcast information sent by the serving cell A, or by receiving RRC dedicated signaling sent by the serving cell A. The frequency of the second transmission carrier frequency may be the same as or may be different from the frequency of the third transmission carrier frequency. A synchronization source obtained by the UE1 through searching on the second transmission carrier frequency is referred to as the first synchronization source, and a synchronization signal sent by the synchronization source is referred to as the first synchronization signal.

The UE1 compares whether the identity corresponding to the first synchronization signal of the first synchronization source obtained through searching is the same as the dedicated synchronization signal identity included in the synchronization control information, and compares the signal quality of the first synchronization source obtained through searching with the first preset threshold included in the synchronization control information, to determine whether to start to send a synchronization signal.

Generally, when the first synchronization source obtained by the UE1 through searching on the second transmission carrier frequency cannot provide a synchronization reference for user equipment surrounding the UE1 to perform D2D communication on the third transmission carrier frequency, the UE1 triggers starting to send a synchronization signal. The UE1 sends a synchronization signal on the third transmission carrier frequency, and the dedicated synchronization signal identity in the synchronization control information is used as an identity of the synchronization signal.

Step S702: The serving cell sends synchronization source detection control information to second user equipment, where the synchronization source detection control information is used to instruct the second user equipment to acquire an identity of a third synchronization signal sent by a second synchronization source that is obtained through searching on a fourth transmission carrier frequency, and signal quality of a third synchronization source, and determine, according to the identity of the third synchronization signal and the signal quality of the third synchronization source, whether to use the second synchronization source as a synchronization source that performs D2D communication on a fifth transmission carrier frequency, and a frequency of the fifth transmission carrier frequency is different from the frequency of the first transmission carrier frequency.

If the user equipment of the serving cell performs D2D communication on the fifth transmission carrier frequency, the user equipment further needs to determine the synchronization source that performs D2D communication on the fifth transmission carrier frequency.

In this embodiment, a serving cell A of user equipment UE2 may send synchronization source detection control information to the UE2, and the UE2 receives the synchronization source detection control information of the serving cell A. The synchronization source detection control information is used to indicate a condition that a synchronization source performing D2D communication on the dedicated transmission carrier frequency needs to satisfy. The UE2 is used as the second user equipment, the serving cell A is used as the serving cell of the UE2, the serving cell A is located on the first transmission carrier frequency, the dedicated transmission carrier frequency is the fifth transmission carrier frequency, and the frequency of the fifth transmission carrier frequency is different from the frequency of the first transmission carrier frequency.

The synchronization source detection control information sent by the serving cell A to the UE2 includes: a dedicated synchronization signal identity, and a preset threshold of signal quality of a synchronization source that performs D2D communication on the third transmission carrier frequency. In this embodiment, the UE2 acquires the synchronization source detection control information by using preconfigured information, by receiving system broadcast information sent by the serving cell A, or by receiving RRC dedicated signaling sent by the serving cell A.

The UE2 searches for a synchronization signal on the determined fourth transmission carrier frequency.

The fourth transmission carrier frequency is a transmission carrier frequency on which a synchronization source may exist, where the synchronization source may provide a synchronization reference for a surrounding terminal to perform D2D communication on the fifth transmission carrier frequency. This embodiment does not limit a method for acquiring the fourth transmission carrier frequency. Optionally, the UE2 may acquire a frequency of the fourth transmission carrier frequency by using preconfigured information, by receiving system broadcast information sent by the serving cell A, or by receiving RRC dedicated signaling sent by the serving cell A. The frequency of the fourth transmission carrier frequency may be the same as or may be different from the frequency of the fifth transmission carrier frequency.

A synchronization source obtained by the UE2 through searching on the fourth transmission carrier frequency is referred to as a third synchronization source, and a synchronization signal sent by the synchronization source is referred to as the third synchronization signal.

The UE2 compares whether the identity of the third synchronization signal is the same as the dedicated signal identity in the synchronization source detection control information and whether the signal quality of the third synchronization source is greater than the preset threshold in the synchronization source detection control information, to determine whether the third synchronization source can be used as the synchronization source that performs D2D communication on the fifth transmission carrier frequency.

According to the D2D synchronization method provided in this embodiment of the present invention, user equipment may determine, according to an identity of a synchronization signal obtained through searching, signal quality of a synchronization source, and synchronization control information of a serving cell, whether to start to send a synchronization signal; if it is determined to start to send a synchronization signal, the user equipment sends a second synchronization signal on a dedicated transmission carrier frequency whose frequency is different from a frequency of a carrier frequency of the serving cell, to control any neighboring user equipment on the dedicated transmission carrier frequency to perform synchronization according to a synchronization signal sent by the user equipment; and the user equipment determines, according to the identity of the synchronization signal obtained through searching, the signal quality of the synchronization source, and synchronization source detection control information of the serving cell, whether to use the synchronization source obtained through searching as a synchronization source that performs D2D communication on the dedicated transmission carrier frequency whose frequency is different from the frequency of the carrier frequency of the serving cell, to perform D2D communication according to the determined synchronization source.

FIG. 11 is a schematic flowchart of still another D2D synchronization method according to an embodiment of the present invention. The method includes the following steps:

Step S801: A serving cell sends synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and when it is determined according to the identity of the first synchronization signal and the signal quality of the first synchronization source that a synchronization signal needs to be sent, send the identity of the first synchronization signal and the signal quality of the first synchronization source to the serving cell.

Step S802: The serving cell receives the identity of the first synchronization signal and the signal quality of the first synchronization source that are sent by the first user equipment.

Step S803: The serving cell sends dedicated indication information to the first user equipment according to the identity of the first synchronization signal and the signal quality of the first synchronization source, where the dedicated indication information is used to instruct the first user equipment to determine a second synchronization signal according to the dedicated indication information.

Specifically, the dedicated indication information may be start indication information, to instruct the first user equipment to use, according to the dedicated indication information, a synchronization signal corresponding to a dedicated synchronization signal identity included in the synchronization control information as the second synchronization signal that is sent by the first user equipment on a third transmission carrier frequency.

The dedicated indication information may be a synchronization signal identity, to instruct the first user equipment to use a synchronization signal corresponding to the synchronization signal identity as the second synchronization signal that is sent by the first user equipment on the third transmission carrier frequency.

Compared with a process of triggering sending of a synchronization signal in the embodiment shown in FIG. 10, in this embodiment, a difference lies in that: after searching for and detecting the first synchronization signal sent by the first synchronization source, if it is determined to start to send a synchronization signal, the first user equipment sends the acquired identity of the first synchronization signal and the acquired signal quality of the first synchronization source to the first serving cell; the first serving cell determines the second synchronization signal that is sent by the first user equipment on the third transmission carrier frequency, and notifies the first user equipment by using the dedicated indication information, where the dedicated indication information triggers the first user equipment to determine the second synchronization signal by using the dedicated indication information, and send the second synchronization signal on the third transmission carrier frequency.

According to the D2D synchronization method provided in this embodiment of the present invention, a serving cell sends synchronization control information to user equipment, and if the user equipment determines to start to send a synchronization signal, the serving cell sends dedicated indication information to the user equipment according to an identity of a first synchronization signal and signal quality of a first synchronization source that are sent by the user equipment; the user equipment sends, according to indication of the dedicated indication information, a second synchronization signal on a dedicated transmission carrier frequency whose frequency is different from a frequency of a carrier frequency of the serving cell, to control any neighboring user equipment on the dedicated transmission carrier frequency to perform synchronization according to a synchronization signal sent by the user equipment.

The following describes, in detail with reference to FIG. 12 to FIG. 18, the user equipment and the serving cell that are provided in the embodiments of the present invention.

Figure 12:
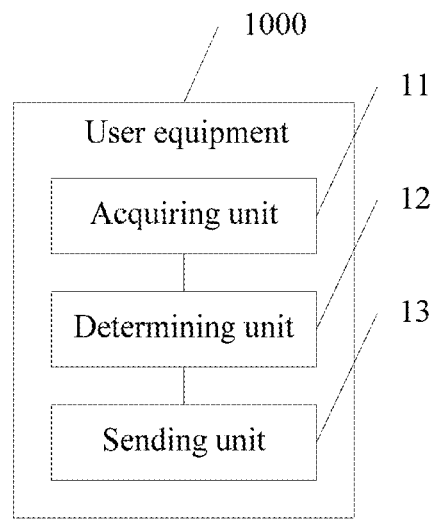
FIG. 12 is a schematic structural diagram of user equipment according to an embodiment of the present invention.

FIG. 12 is a schematic structural diagram of user equipment according to an embodiment of the present invention. User equipment 1000 includes: an acquiring unit 11, a determining unit 12, and a sending unit 13.

The acquiring unit 11 is configured to acquire synchronization control information of a serving cell.

If the user equipment needs to perform D2D communication on a dedicated transmission carrier frequency, the user equipment first needs to perform D2D synchronization, and the serving cell of the user equipment needs to control synchronization operation that is performed by the user equipment on the dedicated transmission carrier frequency. In this embodiment, a serving cell A of user equipment UE1 may send synchronization control information to the UE1, and the UE1 receives the synchronization control information of the serving cell A. The synchronization control information is used to indicate to the user equipment how to perform synchronization operation on the dedicated transmission carrier frequency. The UE1 is used as the first user equipment, the serving cell A is used as the serving cell of the UE1, the serving cell A is located on a first transmission carrier frequency, the dedicated transmission carrier frequency is a third transmission carrier frequency, and a frequency of the third transmission carrier frequency is different from a frequency of the first transmission carrier frequency.

The synchronization control information sent by the serving cell A to the UE1 includes a dedicated synchronization signal identity and a first preset threshold. In this embodiment, the UE1 acquires the synchronization control information by using preconfigured information, by receiving system broadcast information sent by the serving cell A, or by receiving Radio Resource Control dedicated signaling sent by the serving cell A.

The acquiring unit 11 is further configured to acquire an identity of a first synchronization signal sent by a first synchronization source that is obtained through searching on a second transmission carrier frequency, and signal quality of the first synchronization source.

The UE1 searches for a synchronization signal on the determined second transmission carrier frequency.

The second transmission carrier frequency is a transmission carrier frequency on which a synchronization source may exist, where the synchronization source may provide a synchronization reference for a surrounding terminal to perform D2D communication on the third transmission carrier frequency. This embodiment does not limit a method for acquiring information about a frequency of the second transmission carrier frequency. Optionally, the UE1 may acquire the information about the frequency of the second transmission carrier frequency by using preconfigured information, by receiving system broadcast information sent by the serving cell A, or by receiving RRC dedicated signaling sent by the serving cell A. The frequency of the second transmission carrier frequency may be the same as or may be different from the frequency of the third transmission carrier frequency.

A synchronization source obtained by the UE1 through searching on the second transmission carrier frequency is referred to as the first synchronization source, and a synchronization signal sent by the synchronization source is referred to as the first synchronization signal. The UE1 acquires the first synchronization signal sent by the first synchronization source and obtains the signal quality of the first synchronization source through measurement. A specific searching method and signal measurement method are the same as the existing synchronization source searching manner and signal measurement manner, and details are not described herein.

The determining unit 12 is configured to determine, according to the identity of the first synchronization signal, the signal quality of the first synchronization source, and the synchronization control information that are acquired by the acquiring unit, whether to start to send a synchronization signal.

The UE1 compares whether the identity corresponding to the first synchronization signal of the first synchronization source obtained through searching is the same as the dedicated synchronization signal identity included in the synchronization control information, and compares the signal quality of the first synchronization source obtained through searching with the first preset threshold included in the synchronization control information, to determine whether to start to send a synchronization signal.

Generally, when the first synchronization source obtained by the UE1 through searching on the second transmission carrier frequency cannot provide a synchronization reference for user equipment surrounding the UE1 to perform D2D communication on the third transmission carrier frequency, the UE1 triggers starting to send a synchronization signal.

The sending unit 13 is configured to: if the determining unit determines to start to send a synchronization signal, send a second synchronization signal on the third transmission carrier frequency, where the second synchronization signal is used to instruct at least one second user equipment on the third transmission carrier frequency to perform synchronization according to the second synchronization signal.

According to the user equipment provided in this embodiment of the present invention, the user equipment acquires synchronization control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization control information, whether to start to send a synchronization signal; and if it is determined to start to send a synchronization signal, the user equipment sends a second synchronization signal on a third transmission carrier frequency whose frequency is different from a frequency of a carrier frequency of the serving cell, where the second synchronization signal is used to instruct any neighboring user equipment on the third transmission carrier frequency to perform synchronization according to a synchronization signal sent by the user equipment, so that a problem of synchronization between different user equipments in a multi-carrier frequency transmission scenario can be resolved.

Figure 13:
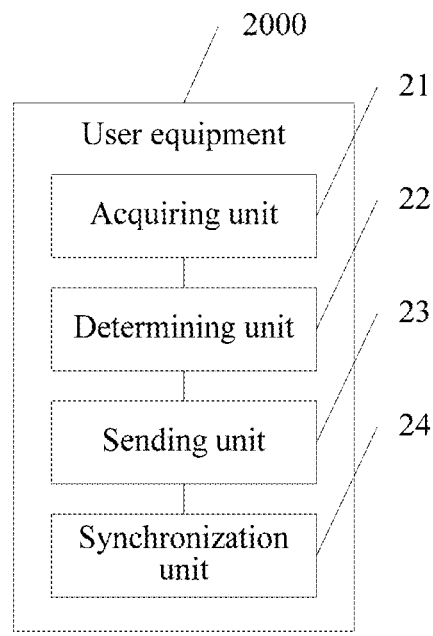
FIG. 13 is a schematic structural diagram of another user equipment according to an embodiment of the present invention.

FIG. 13 is a schematic structural diagram of another user equipment according to an embodiment of the present invention. User equipment 2000 includes: an acquiring unit 21, a determining unit 22, a sending unit 23, and a synchronization unit 24.

The acquiring unit 21 is configured to acquire synchronization control information of a serving cell.

User equipment that performs D2D communication on a dedicated transmission carrier frequency, that is, a third transmission carrier frequency, may be located in network coverage of a serving cell A, or may be located on a network coverage edge of a serving cell A or out of network coverage of a serving cell A, or may belong to serving cells B and C, and may be located in network coverage of the serving cells B and C, or may be located on network coverage edges of the serving cells B and C or out of network coverage of the serving cells B and C. The serving cell A is used as a serving cell of first user equipment UE1 and is located on a first transmission carrier frequency, and a frequency of the first transmission carrier frequency is different from a frequency of the third transmission carrier frequency.

The UE1, as the first user equipment, receives the synchronization control information sent by the serving cell A, where the synchronization control information includes a dedicated synchronization signal identity, and a first preset threshold and/or a second preset threshold.

Optionally, the dedicated synchronization signal identity may be a sidelink synchronization signal identity, and a synchronization signal corresponding to the dedicated synchronization signal identity may be a sidelink synchronization signal. The sidelink synchronization signal includes a primary sidelink synchronization signal and a secondary sidelink synchronization signal.

Optionally, the dedicated synchronization signal identity may also be a physical cell identity, a transmission carrier frequency identity, or a public land mobile network identity.

Optionally, when the dedicated synchronization signal identity is the physical cell identity (PCI), the transmission carrier frequency identity, or the PLMN identity, the synchronization control information may further include a sidelink synchronization signal identity corresponding to the dedicated synchronization signal identity.

Optionally, the synchronization control information may further include a third preset threshold.

The acquiring unit 21 is further configured to acquire an identity of a first synchronization signal sent by a first synchronization source that is obtained through searching on a second transmission carrier frequency, and signal quality of the first synchronization source.

The second transmission carrier frequency is a carrier frequency on which a synchronization source may exist, where the synchronization source may provide a synchronization reference for surrounding user equipment to perform D2D communication on the third transmission carrier frequency. This embodiment does not limit a method for acquiring, by the UE, information about a frequency of the second transmission carrier frequency. Optionally, the UE may further include a third acquiring unit (not shown), where the third acquitting unit is configured to acquire the information about the frequency of the second transmission carrier frequency by using preconfigured information, by receiving system broadcast information sent by the serving cell, or by receiving RRC dedicated control signaling sent by the serving cell, to instruct the first user equipment to search for a synchronization signal on the second transmission carrier frequency.

A synchronization source obtained by the UE1 through searching on the second transmission carrier frequency is referred to as the first synchronization source, and a synchronization signal sent by the synchronization source is referred to as the first synchronization signal. The UE1 acquires the first synchronization signal sent by the first synchronization source and obtains the signal quality of the first synchronization source through measurement. A specific searching method and signal measurement method are the same as the existing synchronization source searching and signal measurement method, and details are not described herein.

The determining unit 22 is configured to determine, by the first user equipment, to start to send a synchronization signal when the identity of the first synchronization signal is the same as the dedicated synchronization signal identity and the signal quality of the first synchronization source is less than the first preset threshold, or when no synchronization signal is obtained through searching, or when the identity of the first synchronization signal is different from the dedicated synchronization signal identity and the signal quality of the first synchronization source is greater than the second preset threshold.

Specifically, when the identity of the first synchronization signal, the signal quality of the first synchronization source, and the synchronization control information satisfy any one of the following conditions, the UE1 determines to start to send a synchronization signal. The condition includes:

the determining unit 22 is specifically configured to: when the identity of the first synchronization signal is the same as the dedicated synchronization signal identity and the signal quality of the first synchronization source is less than or equal to the first preset threshold, determine to start to send a synchronization signal; or the determining unit 22 is further specifically configured to: when no synchronization signal is obtained through searching, determine to start to send a synchronization signal; or the determining unit 22 is further specifically configured to: when the identity of the first synchronization signal is different from the dedicated synchronization signal identity and the signal quality of the first synchronization source is greater than the second preset threshold, determine to start to send a synchronization signal.

Optionally, when the synchronization control information further includes the third preset threshold, when the identity of the first synchronization signal, the signal quality of the first synchronization source, and the synchronization control information satisfy any one of the following conditions, the UE1 may determine to start to send a synchronization signal. The condition includes:

the determining unit 22 is further specifically configured to: when the identity of the first synchronization signal is the same as the dedicated synchronization signal identity, the signal quality of the first synchronization source is less than or equal to the first preset threshold, and signal quality of the serving cell A is greater than or equal to the third preset threshold, determine to start to send a synchronization signal; or the determining unit 22 is further specifically configured to: when no synchronization signal of any synchronization source is obtained through searching and signal quality of the serving cell A is greater than or equal to the third preset threshold, determine to start to send a synchronization signal; or the determining unit 22 is further specifically configured to: when the identity of the first synchronization signal is different from the dedicated synchronization signal identity, the signal quality of the first synchronization source is greater than the second preset threshold, and signal quality of the serving cell A is greater than or equal to the third preset threshold, determine to start to send a synchronization signal.

The sending unit 23 is configured to: if the determining unit determines to start to send a synchronization signal, send a second synchronization signal on the third transmission carrier frequency, where the second synchronization signal is used to instruct at least one second user equipment on the third transmission carrier frequency to perform synchronization according to the second synchronization signal.

The synchronization unit 24 is configured to use a synchronization signal corresponding to the dedicated synchronization signal identity as the second synchronization signal.

Optionally, the user equipment further includes a first synchronization unit (not shown), where the first synchronization unit is configured to: when the dedicated synchronization signal identity is the SLSSID, determine that the second synchronization signal is a sidelink synchronization signal corresponding to the dedicated synchronization signal identity.

Optionally, the first synchronization unit is further specifically configured to: when the dedicated synchronization signal identity is the PCI, the transmission carrier frequency identity, or the PLMN identity, determine that the second synchronization signal is a sidelink synchronization signal corresponding to the dedicated synchronization signal identity, where a correspondence between the dedicated synchronization signal identity and the sidelink synchronization signal may be included in the synchronization control information. For example, the synchronization control information includes a dedicated synchronization signal identity PCI1 and a corresponding dedicated sidelink synchronization signal identity SLSSID1, and when the UE1 detects on the second transmission carrier frequency that the first synchronization signal is the PCI1, if it is determined to send a synchronization signal, the UE1 uses a sidelink synchronization signal corresponding to the SLSSID1 as the second synchronization signal and sends the second synchronization signal on the third transmission carrier frequency.

Optionally, in an alternative manner,
the sending unit is further configured to send the identity of the first synchronization signal and the signal quality of the first synchronization source that are acquired by the acquiring unit to the serving cell;
the receiving unit is configured to receive dedicated indication information sent by the serving cell; and
the synchronization unit is further configured to use a synchronization signal corresponding to the dedicated synchronization signal identity as the second synchronization signal according to the dedicated indication information received by the receiving unit.

That is, the serving cell determines the first synchronization source or selects the first synchronization source from multiple first synchronization sources according to the identity of the first synchronization signal and the signal quality of the first synchronization source, instructing the first user equipment to use the synchronization signal corresponding to the dedicated synchronization signal identity as the second synchronization signal.

The dedicated indication information may be start indication information or a synchronization signal identity.

When the dedicated indication information is the start indication information, the first user equipment uses the synchronization signal corresponding to the dedicated synchronization signal identity in the synchronization control information as the second synchronization signal.

When the dedicated indication information is the synchronization signal identity, a synchronization signal corresponding to the dedicated indication information is used as the second synchronization signal.

It should be noted that, in this embodiment, a synchronization clock of the UE1 needs to be aligned with a synchronization clock of the serving cell A or with a synchronization clock of a synchronization source whose synchronization signal identity is the dedicated synchronization signal identity. A specific clock synchronization method belongs to the prior art, and details are not described herein.

According to the user equipment provided in this embodiment of the present invention, the user equipment acquires synchronization control information of a serving cell; acquires an identity of a first synchronization signal sent by a first synchronization source that is obtained through searching on a second transmission carrier frequency, and signal quality of the first synchronization source; determines to start to send a synchronization signal when a synchronization signal sent by a synchronization source whose synchronization signal identity is the same as a dedicated synchronization signal identity is obtained through searching but signal quality of the synchronization source obtained through searching is less than or equal to a preset threshold, or when no synchronization signal sent by any synchronization source is obtained through searching, or although signal quality of a synchronization source obtained through searching is greater than a preset threshold, a synchronization signal identity of the synchronization source is different from a dedicated synchronization signal identity; and if it is determined to start to send a synchronization signal, uses a synchronization signal corresponding to the dedicated synchronization signal identity as a second synchronization signal, and the user equipment sends the second synchronization signal on a third transmission carrier frequency whose frequency is different from a frequency of a carrier frequency of the serving cell, where the second synchronization signal is used to instruct any user equipment on the third transmission carrier frequency to perform synchronization according to the second synchronization signal sent by the user equipment, so that a problem of synchronization between different user equipments in a multi-carrier frequency transmission scenario can be resolved.

Referring to FIG. 13, another implementation manner of another user equipment provided in an embodiment of the present invention is provided.

An acquiring unit 21 is configured to acquire synchronization control information of a serving cell.

A serving cell A is used as a serving cell of first user equipment UE1 and is located on a first transmission carrier frequency, and the serving cell A provides a network service for the first user equipment UE1. The first acquiring unit 21 receives the synchronization control information sent by the serving cell A, where the synchronization control information includes at least a dedicated synchronization signal identity, a priority corresponding to the dedicated synchronization signal identity, a first preset threshold and/or a second preset threshold, and a first preset priority.

Optionally, the synchronization control information may include multiple dedicated synchronization signal identities, and each dedicated synchronization signal identity has a one-to-one corresponding priority and a corresponding first preset threshold.

Optionally, the dedicated synchronization signal identity may be a sidelink synchronization signal identity (SLSSID), a physical cell identity (PCI), a transmission carrier frequency identity, or a public land mobile network identity.

Optionally, when the dedicated synchronization signal identity is the physical cell identity (PCI), the transmission carrier frequency identity, or the PLMN identity, the synchronization control information may further include a sidelink synchronization signal identity corresponding to the dedicated synchronization signal identity.

Optionally, the synchronization control information may further include a third preset threshold.

The acquiring unit 21 is further configured to acquire an identity of a first synchronization signal sent by a first synchronization source that is obtained through searching on a second transmission carrier frequency, and signal quality of the first synchronization source.

The acquiring unit 21 searches for and detects, on the second transmission carrier frequency, the first synchronization signal sent by the first synchronization source, and acquires the identity of the first synchronization signal and the signal quality of the first synchronization source.

A determining unit 22 is configured to determine, by the first user equipment, to start to send a synchronization signal when the identity of the first synchronization signal is the same as the dedicated synchronization signal identity, the priority corresponding to the dedicated synchronization signal identity is greater than or equal to the first preset priority, and the signal quality of the first synchronization source is less than the third preset threshold, or when the identity of the first synchronization signal is the same as the dedicated synchronization signal identity, the priority corresponding to the dedicated synchronization signal identity is less than the second preset priority, and the signal quality of the first synchronization source is greater than a fourth preset threshold.

Specifically, when any one of the following conditions is satisfied, the determining unit 22 determines to start to send a synchronization signal. The condition includes:

the determining unit 22 is specifically configured to: when the identity of the first synchronization signal is the same as the dedicated synchronization signal identity, the priority corresponding to the dedicated synchronization signal identity is greater than or equal to the first preset priority, and the signal quality of the first synchronization source is less than the first preset threshold, determine to start to send a synchronization signal; or the determining unit 22 is specifically configured to: when the identity of the first synchronization signal is the same as the dedicated synchronization signal identity, the priority corresponding to the dedicated synchronization signal identity is less than the first preset priority, and the signal quality of the first synchronization source is greater than or equal to the second preset threshold, determine to start to send a synchronization signal; or the determining unit 22 is specifically configured to: when no synchronization signal of any synchronization source is obtained through searching, determine to start to send a synchronization signal.

Optionally, when the synchronization control information further includes the third preset threshold, when the identity of the first synchronization signal, the signal quality of the first synchronization source, and the synchronization control information satisfy any one of the following conditions, the determining unit 22 may determine to start to send a synchronization signal. The condition includes:

the determining unit 22 is specifically configured to: when the identity of the first synchronization signal is the same as the dedicated synchronization signal identity, the priority corresponding to the dedicated synchronization signal identity is greater than or equal to the first preset priority, the signal quality of the first synchronization source is less than the first preset threshold, and signal quality of the serving cell A is greater than or equal to the third preset threshold, determine to start to send a synchronization signal; or the determining unit 22 is specifically configured to: when the identity of the first synchronization signal is the same as the dedicated synchronization signal identity, the priority corresponding to the dedicated synchronization signal identity is less than the first preset priority, the signal quality of the first synchronization source is greater than or equal to the second preset threshold, and signal quality of the serving cell A is greater than or equal to the third preset threshold, determine to start to send a synchronization signal; or the determining unit 22 is specifically configured to: when no synchronization signal of any synchronization source is obtained through searching and signal quality of the serving cell A is greater than or equal to the third preset threshold, determine to start to send a synchronization signal.

A sending unit 23 is configured to: if the determining unit determines to start to send a synchronization signal, send a second synchronization signal on a third transmission carrier frequency, where the second synchronization signal is used to instruct at least one second user equipment on the third transmission carrier frequency to perform synchronization according to the second synchronization signal, and a frequency of the third transmission carrier frequency is different from a frequency of the first transmission carrier frequency.

A synchronization unit 24 is configured to use a synchronization signal corresponding to the dedicated synchronization signal identity as the second synchronization signal; or the acquiring unit 21 is further configured to acquire a second sidelink synchronization signal identity; and the synchronization unit 24 is further configured to use a synchronization signal corresponding to the second sidelink synchronization signal identity acquired by the acquiring unit as the second synchronization signal, where the second sidelink synchronization signal identity is included in the synchronization control information and corresponds to the dedicated synchronization signal identity.

Optionally, the synchronization unit 24 is further configured to: when the dedicated synchronization signal identity is the SLSSID, determine that the second synchronization signal is a sidelink synchronization signal corresponding to the dedicated synchronization signal identity.

Optionally, the acquiring unit 21 is further configured to acquire a first sidelink synchronization signal identity; and the synchronization unit 24 is further configured to: when the dedicated synchronization signal identity is the PCI, the transmission carrier frequency identity, or the PLMN identity, determine that the second synchronization signal is a sidelink synchronization signal corresponding to the sidelink synchronization identity corresponding to the dedicated synchronization signal identity, where the sidelink synchronization signal identity corresponding to the dedicated synchronization signal identity may be included in the synchronization control information. For example, the synchronization control information includes a dedicated synchronization signal identity PCI1 and a corresponding dedicated sidelink synchronization signal identity SLSSID1, and when the UE1 detects on the second transmission carrier frequency that the first synchronization signal is the PCI1, if it is determined to send a synchronization signal, the UE1 uses a sidelink synchronization signal corresponding to the SLSSID1 as the second synchronization signal and sends the second synchronization signal on the third transmission carrier frequency.

Optionally, when the synchronization control information includes multiple dedicated synchronization signal identities and the UE1 detects, on at least one second transmission carrier frequency, multiple first synchronization sources that satisfy conditions of starting to send a synchronization signal, the UE1 may determine a synchronization source with a highest priority corresponding to a synchronization signal identity in the first synchronization sources, and use a sidelink synchronization signal corresponding to the synchronization source as the second synchronization signal. If the identity of the first synchronization signal obtained through searching is the same as the dedicated synchronization signal identity, the first synchronization signal has a priority the same as a priority corresponding to the dedicated synchronization signal identity, and therefore, the priority of the first synchronization source is known.

In an alternative manner:

the sending unit is further configured to send the identity of the first synchronization signal and the signal quality of the first synchronization source that are acquired by the second acquiring unit to the serving cell;

the receiving unit is configured to receive dedicated indication information sent by the serving cell; and the synchronization unit is further configured to use a synchronization signal corresponding to the dedicated synchronization signal identity as the second synchronization signal according to the dedicated indication information received by the receiving unit.

In another alternative manner:

the sending unit is further configured to send the identity of the first synchronization signal and the signal quality of the first synchronization source to the serving cell;

the receiving unit is further configured to receive dedicated indication information sent by the serving cell; and the synchronization unit is further configured to use a synchronization signal corresponding to the dedicated synchronization signal identity as the second synchronization signal according to the dedicated indication information received by the receiving unit.

That is, the serving cell determines the first synchronization source or selects the first synchronization source from multiple first synchronization sources according to the identity of the first synchronization signal and the signal quality of the first synchronization source, instructing the first user equipment to use the synchronization signal corresponding to the dedicated synchronization signal identity as the second synchronization signal.

The dedicated indication information may be start indication information or a synchronization signal identity.

When the dedicated indication information is the start indication information, the first user equipment uses the synchronization signal corresponding to the dedicated synchronization signal identity in the synchronization control information as the second synchronization signal.

When the dedicated indication information is the synchronization signal identity, a synchronization signal corresponding to the dedicated indication information is used as the second synchronization signal.

Another UE on the third transmission carrier frequency searches for a synchronization source on a specified transmission carrier frequency according to synchronization source detection control information sent by a serving cell of the UE; if a synchronization signal identity of the synchronization source obtained through searching is the same as the dedicated synchronization signal identity and signal quality of the synchronization source is greater than a preset signal quality threshold, determines that the synchronization source is a candidate synchronization source; and when multiple candidate synchronization sources are determined, determines that a synchronization source with a highest priority corresponding to a synchronization signal identity in the multiple candidate synchronization sources is a synchronization source that performs D2D communication on the third transmission carrier frequency.

According to the user equipment provided in this embodiment of the present invention, the user equipment acquires synchronization control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization control information, whether to start to send a synchronization signal; and if it is determined to start to send a synchronization signal, the user equipment sends a second synchronization signal on a third transmission carrier frequency whose frequency is different from a frequency of a carrier frequency of the serving cell, where the second synchronization signal is used to instruct any user equipment on the third transmission carrier frequency to select a synchronization signal that has a highest priority and whose signal quality satisfies a condition, to perform synchronization, so that a problem of synchronization between different user equipments in a multi-carrier frequency transmission scenario can be resolved.

Figure 14:
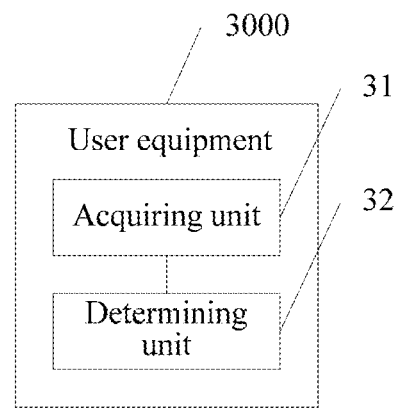
FIG. 14 is a schematic structural diagram of still another user equipment according to an embodiment of the present invention.

FIG. 14 is a schematic structural diagram of still another user equipment according to an embodiment of the present invention. User equipment 3000 includes: an acquiring unit 31 and a determining unit 32.

The acquiring unit 31 is configured to acquire synchronization source detection control information of a serving cell, where the serving cell is located on a first transmission carrier frequency.

If the user equipment needs to perform D2D communication on a dedicated transmission carrier frequency, that is, a third transmission carrier frequency, the user equipment first needs to perform D2D synchronization, and the serving cell of the user equipment needs to control synchronization operation that is performed by the user equipment on the dedicated transmission carrier frequency. In this embodiment, a serving cell B of user equipment UE2 may send synchronization source detection control information to the UE2, and the UE2 receives the synchronization source detection control information of the serving cell B. The synchronization source detection control information is used to indicate a condition that a synchronization source choosing to perform D2D communication on the dedicated transmission carrier frequency needs to satisfy. The UE2 is used as the user equipment in this embodiment, the serving cell B is used as the serving cell of the user equipment UE2, the serving cell B is located on the first transmission carrier frequency, the dedicated transmission carrier frequency is the third transmission carrier frequency, and a frequency of the third transmission carrier frequency is different from a frequency of the first transmission carrier frequency.

The synchronization source detection control information sent by the serving cell B to the UE2 includes a dedicated synchronization signal identity and a first preset threshold. In this embodiment, the acquiring unit 31 is further configured to acquire the synchronization source detection control information by using preconfigured information, by receiving system broadcast information sent by the serving cell B, or by receiving RRC dedicated signaling sent by the serving cell B.

The acquiring unit 31 is further configured to acquire an identity of a first synchronization signal sent by a first synchronization source that is obtained through searching on a second transmission carrier frequency, and signal quality of the first synchronization source.

The determining unit 32 is configured to determine, according to the identity of the first synchronization signal, the signal quality of the first synchronization source, and the synchronization source detection control information that are acquired by the acquiring unit, whether to use the first synchronization source as a synchronization source that performs D2D communication on the third transmission carrier frequency, where the frequency of the third transmission carrier frequency is different from the frequency of the first transmission carrier frequency.

The UE2 searches for a synchronization signal on the determined second transmission carrier frequency.

The second transmission carrier frequency is a transmission carrier frequency on which a synchronization source may exist, where the synchronization source may provide a synchronization reference for a surrounding terminal to perform D2D communication on the third transmission carrier frequency. This embodiment does not limit a method for acquiring information about a frequency of the second transmission carrier frequency. Optionally, the acquiring unit 31 is further configured to acquire the information about the frequency of the second transmission carrier frequency by using preconfigured information, by receiving system broadcast information sent by the serving cell B, or by receiving RRC dedicated signaling sent by the serving cell B. The frequency of the second transmission carrier frequency may be the same as or may be different from the frequency of the third transmission carrier frequency.

A synchronization source obtained by the UE2 through searching on the second transmission carrier frequency is referred to as the first synchronization source, and a synchronization signal sent by the synchronization source is referred to as the first synchronization signal. The UE2 acquires the first synchronization signal sent by the first synchronization source and obtains the signal quality of the first synchronization source through measurement. A specific searching method and signal measurement method are the same as the existing synchronization source searching manner and signal measurement manner, and details are not described herein.

The UE2 compares whether the identity of the first synchronization signal is the same as the dedicated signal identity in the synchronization source detection control information and whether the signal quality of the first synchronization source is greater than the first preset threshold in the synchronization source detection control information, to determine whether the first synchronization source can be used as the synchronization source that performs D2D communication on the third transmission carrier frequency.

According to the user equipment provided in this embodiment of the present invention, the user equipment acquires synchronization source detection control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization source detection control information, whether to use the first synchronization source as a synchronization source that performs D2D communication on a third transmission carrier frequency whose frequency is different from a frequency of a carrier frequency of the serving cell, to perform D2D communication according to the determined synchronization source.

Referring to FIG. 14, a specific implementation manner of still another user equipment provided in an embodiment of the present invention is described.

An acquiring unit 31 is configured to acquire synchronization source detection control information of a serving cell.

UE2, as the user equipment in this embodiment, receives the synchronization source detection control information sent by a serving cell B. The serving cell B is used as the serving cell of the user equipment UE2, and the synchronization source detection control information includes a dedicated synchronization signal identity and a first preset threshold.

Optionally, the dedicated synchronization signal identity may be an SLSSID, and a synchronization signal corresponding to the dedicated synchronization signal identity may be an SLSS. A sidelink synchronization signal includes a PSSS and an SSSS.

Optionally, the dedicated synchronization signal identity may be a PCI, a transmission carrier frequency identity, or a PLMN identity.

The acquiring unit 31 is further configured to acquire an identity of a first synchronization signal sent by a first synchronization source that is obtained through searching on a second transmission carrier frequency, and signal quality of the first synchronization source.

The second transmission carrier frequency is a carrier frequency on which a synchronization source may exist, where the synchronization source may provide a synchronization reference for surrounding user equipment to perform D2D communication on a third transmission carrier frequency.

This embodiment does not limit a method for acquiring, by the UE, information about a frequency of the second transmission carrier frequency. Optionally, the acquiring unit 31 is further configured to acquire the information about the frequency of the second transmission carrier frequency by using preconfigured information, by receiving system broadcast information sent by the serving cell, or by receiving RRC dedicated control signaling sent by the serving cell, to instruct the user equipment to search for a synchronization signal on the second transmission carrier frequency.

A synchronization source obtained by the UE2 through searching on the second transmission carrier frequency is referred to as the first synchronization source, and the UE2 acquires the first synchronization signal sent by the first synchronization source and obtains the signal quality of the first synchronization source through measurement. A specific searching method and signal measurement method are the same as the existing synchronization source searching and signal measurement method, and details are not described herein.

A determining unit 32 is configured to determine, according to the identity of the first synchronization signal, the signal quality of the first synchronization source, and the synchronization source detection control information that are acquired by the acquiring unit, whether to use the first synchronization source as a synchronization source that performs D2D communication on the third transmission carrier frequency, where a frequency of the third transmission carrier frequency is different from a frequency of a first transmission carrier frequency.

The first determining unit 32 is specifically configured to: when the identity of the first synchronization signal obtained through searching is the same as the dedicated synchronization signal identity and the signal quality of the first synchronization source is greater than a preset threshold, determine to use the first synchronization source as the synchronization source that performs D2D communication on the third transmission carrier frequency. A frequency of a fourth transmission carrier frequency is different from the frequency of the third transmission carrier frequency.

According to the user equipment provided in this embodiment of the present invention, the user equipment acquires synchronization source detection control information of a serving cell, acquires an identity of a first synchronization signal sent by a first synchronization source that is obtained through searching on a second transmission carrier frequency, and signal quality of the first synchronization source, and when the identity of the first synchronization signal is the same as a dedicated synchronization signal identity and the signal quality of the first synchronization source is greater than a first preset threshold, determines to use the first synchronization source as a synchronization source that performs D2D communication on a third transmission carrier frequency whose frequency is different from a frequency of a carrier frequency of the serving cell, to perform D2D communication according to the determined synchronization source.

Referring to FIG. 14, another specific implementation manner of still another user equipment provided in an embodiment of the present invention is described.

An acquiring unit 31 is configured to acquire synchronization source detection control information of a serving cell, where the second serving cell is located on a first transmission carrier frequency.

A serving cell B is used as a serving cell of user equipment UE2 and is located on the first transmission carrier frequency, and the serving cell B provides a network service for the second user equipment UE2. The UE2 receives the synchronization source detection control information sent by the serving cell B, and the synchronization source detection control information includes a dedicated synchronization signal identity, a priority corresponding to the dedicated synchronization signal identity, and a second preset threshold.

Optionally, the synchronization source detection control information may include multiple dedicated synchronization signal identities, and each dedicated synchronization signal identity has a one-to-one corresponding priority and a corresponding second preset threshold.

Optionally, the dedicated synchronization signal identity may be an SLSSID, a PCI, a transmission carrier frequency identity, or a PLMN identity.

Optionally, the user equipment may include a fourth acquiring unit, where the fourth acquiring unit is configured to acquire the synchronization source detection control information by using preconfigured information, by receiving system information broadcast by the second serving cell, or by receiving RRC dedicated control signaling sent by the second serving cell.

The acquiring unit 31 is further configured to acquire an identity of a first synchronization signal sent by a first synchronization source that is obtained through searching on a second transmission carrier frequency, and signal quality of the first synchronization source.

The determining unit 32 is configured to: when the identity of the first synchronization signal is the same as the dedicated synchronization signal identity and the signal quality of the first synchronization source is greater than the second preset threshold, determine that the first synchronization source is a candidate synchronization source.

As described above, the synchronization source detection control information may include multiple dedicated synchronization signal identities, and each dedicated synchronization signal identity has a one-to-one corresponding priority and a corresponding second preset threshold. When multiple first synchronization signals are obtained through searching, identities of the multiple first synchronization signals are respectively the same as the dedicated synchronization signal identities, and the signal quality of the first synchronization source is greater than the corresponding second preset threshold, it is determined that the first synchronization source is a candidate synchronization source, to determine multiple candidate synchronization sources.

A determining unit 32 is further configured to: when at least one candidate synchronization source is determined, determine that a synchronization source with a highest priority corresponding to a dedicated synchronization signal identity in the at least one candidate synchronization source is a synchronization source that performs D2D communication on a third transmission carrier frequency.

When the synchronization source that performs D2D communication on the third transmission carrier frequency is finally determined, it is determined that a synchronization source with a highest priority corresponding to a dedicated synchronization signal identity in the multiple candidate synchronization sources is the synchronization source that performs D2D communication on the third transmission carrier frequency. A frequency of a fourth transmission carrier frequency is different from a frequency of the third transmission carrier frequency.

According to the user equipment provided in this embodiment of the present invention, the user equipment acquires synchronization source detection control information of a serving cell, acquires an identity of a first synchronization signal sent by a first synchronization source that is obtained through searching on a second transmission carrier frequency, and signal quality of the first synchronization source, and when the identity of the first synchronization signal is the same as a dedicated synchronization signal identity and the signal quality of the first synchronization source is greater than a second preset threshold, determines that the first synchronization source is a candidate synchronization source, and determines that a synchronization source with a highest priority corresponding to a dedicated synchronization signal identity in at least one candidate synchronization source is a synchronization source that performs D2D communication on a third transmission carrier frequency whose frequency is different from a frequency of a carrier frequency of the serving cell, to perform D2D communication according to the determined synchronization source.

Figure 15:
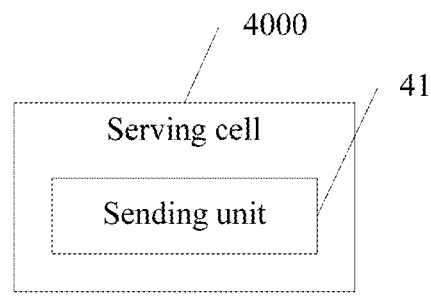
FIG. 15 is a schematic structural diagram of a serving cell according to an embodiment of the present invention.

FIG. 15 is a schematic structural diagram of a serving cell according to an embodiment of the present invention. A serving cell 4000 includes:

a sending unit 41, configured to send synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and determine, according to the identity of the first synchronization signal and the signal quality of the first synchronization source, whether to send a second synchronization signal on a third transmission carrier frequency, the serving cell is located on a first transmission carrier frequency, and a frequency of the first transmission carrier frequency is different from a frequency of the third transmission carrier frequency.

If user equipment needs to perform D2D communication on a dedicated transmission carrier frequency, a serving cell of the user equipment needs to control synchronization operation that is performed by the user equipment on the dedicated transmission carrier frequency. In this embodiment, a serving cell A of user equipment UE1 may send synchronization control information to the UE1, and the UE1 receives the synchronization control information of the serving cell A. The synchronization control information is used to indicate to the user equipment how to perform synchronization operation on the dedicated transmission carrier frequency. The UE1 is used as the first user equipment, the serving cell A is used as the serving cell of the UE1, the serving cell A is located on the first transmission carrier frequency, the dedicated transmission carrier frequency is the third transmission carrier frequency, and the frequency of the third transmission carrier frequency is different from the frequency of the first transmission carrier frequency.

The synchronization control information sent by the serving cell A to the UE1 includes a dedicated synchronization signal identity and a first preset threshold. In this embodiment, the UE1 acquires the synchronization control information by using preconfigured information, by receiving system broadcast information sent by the serving cell A, or by receiving RRC dedicated signaling sent by the serving cell A.

The UE1 searches for a synchronization signal on the determined second transmission carrier frequency.

The second transmission carrier frequency is a transmission carrier frequency on which a synchronization source may exist, where the synchronization source may provide a synchronization reference for a surrounding terminal to perform D2D communication on the third transmission carrier frequency. This embodiment does not limit a method for acquiring the second transmission carrier frequency. Optionally, the UE1 may acquire a frequency of the second transmission carrier frequency by using preconfigured information, by receiving system broadcast information sent by the serving cell A, or by receiving RRC dedicated signaling sent by the serving cell A. The frequency of the second transmission carrier frequency may be the same as or may be different from the frequency of the third transmission carrier frequency. A synchronization source obtained by the UE1 through searching is referred to as the first synchronization source, and a synchronization signal sent by the synchronization source is referred to as the first synchronization signal.

The UE1 compares whether the identity corresponding to the first synchronization signal of the first synchronization source obtained through searching is the same as the dedicated synchronization signal identity included in the synchronization control information, and compares the signal quality of the first synchronization source obtained through searching with the first preset threshold included in the synchronization control information, to determine whether to start to send a synchronization signal.

Generally, when the first synchronization source obtained by the UE1 through searching on the second transmission carrier frequency cannot provide a synchronization reference for user equipment surrounding the UE1 to perform D2D communication on the third transmission carrier frequency, the UE1 triggers starting to send a synchronization signal. The UE1 sends a synchronization signal on the third transmission carrier frequency, and the dedicated synchronization signal identity in the synchronization control information is used as an identity of the synchronization signal.

The sending unit 41 is further configured to send synchronization source detection control information to second user equipment, where the synchronization source detection control information is used to instruct the second user equipment to acquire an identity of a third synchronization signal sent by a second synchronization source that is obtained through searching on a fourth transmission carrier frequency, and signal quality of a third synchronization source, and determine, according to the identity of the third synchronization signal and the signal quality of the third synchronization source, whether to use the second synchronization source as a synchronization source that performs D2D communication on a fifth transmission carrier frequency, and a frequency of the fifth transmission carrier frequency is different from the frequency of the first transmission carrier frequency.

If the user equipment of the serving cell performs D2D communication on the fifth transmission carrier frequency, the user equipment further needs to determine the synchronization source that performs D2D communication on the fifth transmission carrier frequency.

In this embodiment, a serving cell A of user equipment UE2 may send synchronization source detection control information to the UE2, and the UE2 receives the synchronization source detection control information of the serving cell A. The synchronization source detection control information is used to indicate a condition that a synchronization source performing D2D communication on the dedicated transmission carrier frequency needs to satisfy. The UE2 is used as the second user equipment, the serving cell A is used as the serving cell of the UE2, the serving cell A is located on the first transmission carrier frequency, the dedicated transmission carrier frequency is the fifth transmission carrier frequency, and the frequency of the fifth transmission carrier frequency is different from the frequency of the first transmission carrier frequency.

The synchronization source detection control information sent by the serving cell A to the UE2 includes: a dedicated synchronization signal identity, and a preset threshold of signal quality of a synchronization source that performs D2D communication on the third transmission carrier frequency. In this embodiment, the UE2 acquires the synchronization source detection control information by using preconfigured information, by receiving system broadcast information sent by the serving cell A, or by receiving RRC dedicated signaling sent by the serving cell A.

The UE2 searches for a synchronization signal on the determined fourth transmission carrier frequency.

The fourth transmission carrier frequency is a transmission carrier frequency on which a synchronization source may exist, where the synchronization source may provide a synchronization reference for a surrounding terminal to perform D2D communication on the fifth transmission carrier frequency. This embodiment does not limit a method for acquiring the fourth transmission carrier frequency. Optionally, the UE2 may acquire a frequency of the fourth transmission carrier frequency by using preconfigured information, by receiving system broadcast information sent by the serving cell A, or by receiving RRC dedicated signaling sent by the serving cell A. The frequency of the fourth transmission carrier frequency may be the same as or may be different from the frequency of the fifth transmission carrier frequency.

A synchronization source obtained by the UE2 through searching on the fourth transmission carrier frequency is referred to as the third synchronization source, and a synchronization signal sent by the synchronization source is referred to as the third synchronization signal.

The UE2 compares whether the identity of the third synchronization signal is the same as a dedicated signal identity in the synchronization source detection control information and whether the signal quality of the third synchronization source is greater than a preset threshold in the synchronization source detection control information, to determine whether the third synchronization source can be used as the synchronization source that performs D2D communication on the fifth transmission carrier frequency.

According to the serving cell provided in this embodiment of the present invention, user equipment may determine, according to an identity of a synchronization signal obtained through searching, signal quality of a synchronization source, and synchronization control information of the serving cell, whether to start to send a synchronization signal; if it is determined to start to send a synchronization signal, the user equipment sends a second synchronization signal on a dedicated transmission carrier frequency whose frequency is different from a frequency of a carrier frequency of the serving cell, to control any neighboring user equipment on the dedicated transmission carrier frequency to perform synchronization according to a synchronization signal sent by the user equipment; and the user equipment determines, according to the identity of the synchronization signal obtained through searching, the signal quality of the synchronization source, and synchronization source detection control information of the serving cell, whether to use the synchronization source obtained through searching as a synchronization source that performs D2D communication on the dedicated transmission carrier frequency whose frequency is different from the frequency of the carrier frequency of the serving cell, to perform D2D communication according to the determined synchronization source.

Figure 16:
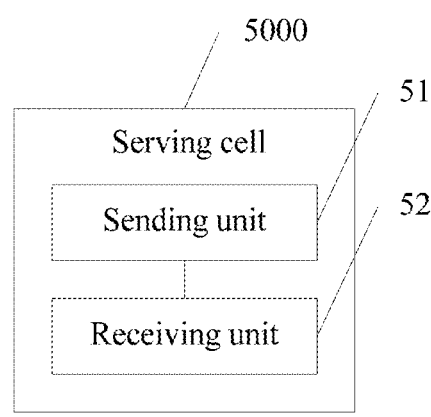
FIG. 16 is a schematic structural diagram of another serving cell according to an embodiment of the present invention.

FIG. 16 is a schematic structural diagram of another serving cell according to an embodiment of the present invention. A serving cell 5000 includes:

- a sending unit 51, configured to send synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and when it is determined, according to the identity of the first synchronization signal and the signal quality of the first synchronization source, that a synchronization signal needs to be sent, send the identity of the first synchronization signal and the signal quality of the first synchronization source to the serving cell; and
- a receiving unit 52, configured to receive the identity of the first synchronization signal and the signal quality of the first synchronization source that are sent by the first user equipment, where
- the sending unit 51 is further configured to send dedicated indication information to the first user equipment according to the identity of the first synchronization signal and the signal quality of the first synchronization source that are received by the receiving unit, where the synchronization control information is used to instruct the first user equipment to determine a second synchronization signal according to the dedicated indication information.

Specifically, the dedicated indication information may be start indication information, to instruct the first user equipment to use, according to the dedicated indication information, a synchronization signal corresponding to a dedicated synchronization signal identity included in the synchronization control information as the second synchronization signal that is sent by the first user equipment on a third transmission carrier frequency.

The dedicated indication information may be a synchronization signal identity, to instruct the first user equipment to use a synchronization signal corresponding to the synchronization signal identity as the second synchronization signal that is sent by the first user equipment on the third transmission carrier frequency.

Compared with triggering of synchronization signal sending in the embodiment shown in FIG. 15, in this embodiment, a difference lies in that: after searching for and detecting the first synchronization signal sent by the first synchronization source, if it is determined to start to send a synchronization signal, the first user equipment sends the acquired identity of the first synchronization signal and the acquired signal quality of the first synchronization source to the first serving cell; the first serving cell determines the second synchronization signal that is sent by the first user equipment on the third transmission carrier frequency, and notifies the first user equipment by using the dedicated indication information, where the dedicated indication information triggers the first user equipment to determine the second synchronization signal by using the dedicated indication information, and send the second synchronization signal on the third transmission carrier frequency.

According to the serving cell provided in this embodiment of the present invention, the serving cell sends synchronization control information to user equipment, and if the user equipment determines to start to send a synchronization signal, the serving cell sends dedicated indication information to the user equipment according to an identity of a first synchronization signal and signal quality of a first synchronization source that are sent by the user equipment; the user equipment sends, according to indication of the dedicated indication information, a second synchronization signal on a dedicated transmission carrier frequency whose frequency is different from a frequency of a carrier frequency of the serving cell, to control any neighboring user equipment on the dedicated transmission carrier frequency to perform synchronization according to a synchronization signal sent by the user equipment.

Figure 17:
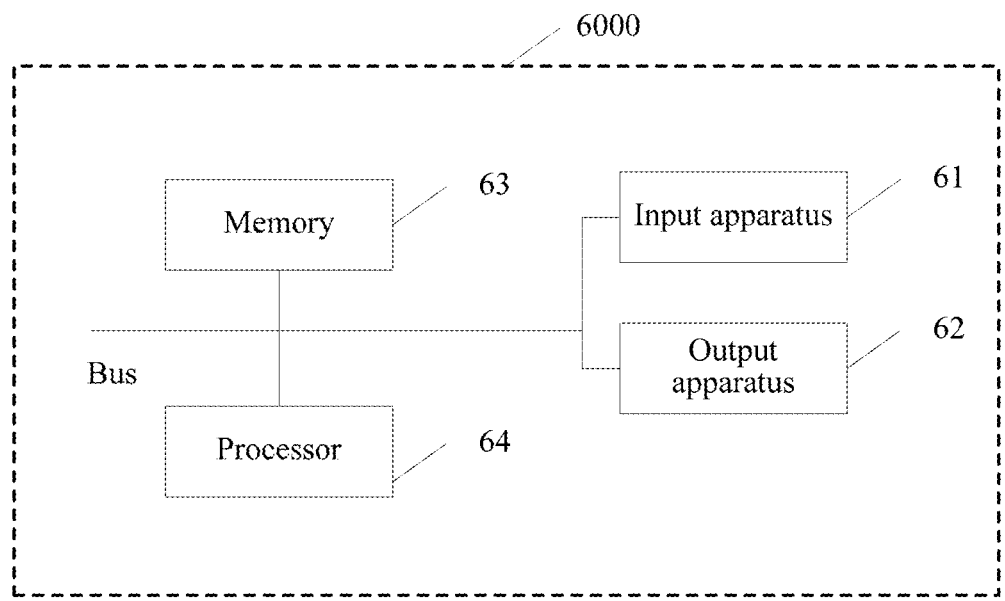
FIG. 17 is a schematic structural diagram of still another user equipment according to an embodiment of the present invention.

FIG. 17 is a schematic structural diagram of still another user equipment according to an embodiment of the present invention. User equipment 6000 includes an input apparatus 61, an output apparatus 62, a memory 63, and a processor 64 (there may be one or more processors 64 in the user equipment, and FIG. 17 uses an example in which there is one processor). In some embodiments of the present invention, the input apparatus 61, the output apparatus 62, the memory 63, and the processor 64 may be connected by using a bus or in another manner, and FIG. 17 uses an example in which connection is implemented by using a bus.

The processor 64 is configured to perform the following steps:

- acquiring synchronization control information of a serving cell, where the serving cell is located on a first transmission carrier frequency;
- acquiring an identity of a first synchronization signal sent by a first synchronization source that is obtained through searching on a second transmission carrier frequency, and signal quality of the first synchronization source;
- determining, according to the identity of the first synchronization signal, the signal quality of the first synchronization source, and the synchronization control information, whether to start to send a synchronization signal; and
- if it is determined to start to send a synchronization signal, sending a second synchronization signal on a third transmission carrier frequency, where the second synchronization signal is used to instruct at least one second user equipment on the third transmission carrier frequency to perform synchronization according to the second synchronization signal, and a frequency of the third transmission carrier frequency is different from a frequency of the first transmission carrier frequency.

In an implementation manner, before the performing, by the processor, the step of acquiring an identity of a first synchronization signal sent by a first synchronization source that is obtained through searching on a second transmission carrier frequency, and signal quality of the first synchronization source, the processor further performs the following step:

- acquiring information about a frequency of the second transmission carrier frequency by using preconfigured information, by receiving system broadcast information sent by the serving cell, or by receiving RRC dedicated control signaling sent by the serving cell, where the information about the frequency is used to instruct the first user equipment to search for a synchronization signal on the second transmission carrier frequency corresponding to the information about the frequency.

In another implementation manner, the synchronization control information includes a dedicated synchronization signal identity and a first preset threshold; and the performing, by the processor, the step of determining, according to the identity information of the first synchronization signal, the signal quality of the first synchronization source, and the synchronization control information, whether to start to send a synchronization signal includes:

when the identity of the first synchronization signal is the same as the dedicated synchronization signal identity and the signal quality of the first synchronization source is less than the first preset threshold, determining, by the first user equipment, to start to send a synchronization signal; or when no synchronization signal is obtained through searching, determining, by the first user equipment, to start to send a synchronization signal.

In still another implementation manner, the synchronization control information includes a dedicated synchronization signal identity and a second preset threshold; and the performing, by the processor, the step of determining, according to the identity information of the first synchronization signal, the signal quality of the first synchronization source, and the synchronization control information, whether to start to send a synchronization signal includes:

when the identity of the first synchronization signal is different from the dedicated synchronization signal identity and the signal quality of the first synchronization source is greater than the second preset threshold, determining to start to send a synchronization signal.

In still another implementation manner, after the performing, by the processor, the step of determining to start to send a synchronization signal, the processor further performs the following steps:

using a synchronization signal corresponding to the dedicated synchronization signal identity as the second synchronization signal; or sending the identity of the first synchronization signal and the signal quality of the first synchronization source to the serving cell;

receiving dedicated indication information sent by the serving cell; and using a synchronization signal corresponding to the dedicated synchronization signal identity as the second synchronization signal according to the dedicated indication information.

In still another implementation manner, the frequency of the second transmission carrier frequency is the same as the frequency of the third transmission carrier frequency.

In still another implementation manner, the synchronization control information includes a dedicated synchronization signal identity, a priority corresponding to the dedicated synchronization signal identity, a first preset priority, and a third preset threshold; and the performing, by the processor, the step of determining, according to the identity of the first synchronization signal, the signal quality of the first synchronization source, and the synchronization control information, whether to start to send a synchronization signal includes:

when the identity of the first synchronization signal is the same as the dedicated synchronization signal identity, the priority corresponding to the dedicated synchronization signal identity is greater than or equal to the first preset priority, and the signal quality of the first synchronization source is less than the third preset threshold, determining to start to send a synchronization signal.

In still another implementation manner, after the performing, by the processor, the step of determining to start to send a synchronization signal, the processor further performs the following steps:

using a synchronization signal corresponding to the dedicated synchronization signal identity as the second synchronization signal; or acquiring a first sidelink synchronization signal identity; and using a synchronization signal corresponding to the first sidelink synchronization signal identity as the second synchronization signal, where the first sidelink synchronization signal identity is included in the synchronization control information and corresponds to the dedicated synchronization signal identity; and if the synchronization control information includes multiple dedicated synchronization signal identities, when the first user equipment detects multiple first synchronization sources to which a synchronization signal can be started to send, acquiring a first sidelink synchronization signal identity corresponding to a dedicated synchronization signal identity that has a highest priority and that can be used for starting to send a synchronization signal, and using a synchronization signal corresponding to the first sidelink synchronization signal identity as the second synchronization signal; or sending the identity of the first synchronization signal and the signal quality of the first synchronization source to the serving cell;

receiving dedicated indication information sent by the serving cell; and using a synchronization signal corresponding to the dedicated synchronization signal identity as the second synchronization signal according to the dedicated indication information.

In still another implementation manner, the synchronization control information includes a dedicated synchronization signal identity, a priority corresponding to the dedicated synchronization signal identity, a second preset priority, and a fourth preset threshold; and the performing, by the processor, the step of determining, according to the identity of the first synchronization signal, the signal quality of the first synchronization source, and the synchronization control information, whether to start to send a synchronization signal includes:

when the identity of the first synchronization signal is the same as the dedicated synchronization signal identity, the priority corresponding to the dedicated synchronization signal identity is less than the second preset priority, and the signal quality of the first synchronization source is greater than the fourth preset threshold, determining to start to send a synchronization signal.

In still another implementation manner, after the performing, by the processor, the step of determining to start to send a synchronization signal, the processor further performs the following steps:

using a synchronization signal corresponding to the dedicated synchronization signal identity as the second synchronization signal; or acquiring a second sidelink synchronization signal identity; and using a synchronization signal corresponding to the second sidelink synchronization signal identity as the second synchronization signal, where the second sidelink synchronization signal identity is included in the synchronization control information and corresponds to the dedicated synchronization signal identity; or sending the identity of the first synchronization signal and the signal quality of the first synchronization source to the first serving cell;

receiving dedicated indication information sent by the serving cell; and using a synchronization signal corresponding to the dedicated synchronization signal identity as the second synchronization signal according to the dedicated indication information.

In still another implementation manner, the dedicated synchronization signal identity includes a physical cell identity (PCI), a sidelink synchronization signal identity (SLSSID), a PLMN identity, or a transmission carrier frequency identity.

In still another implementation manner, the processor further performs the following steps:

acquiring the synchronization control information by using preconfigured information, by receiving system information broadcast by the serving cell, or by receiving RRC dedicated control signaling sent by the serving cell.

According to the user equipment provided in this embodiment of the present invention, the user equipment acquires synchronization control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization control information, whether to start to send a synchronization signal; and if it is determined to start to send a synchronization signal, the user equipment sends a second synchronization signal on a third transmission carrier frequency whose frequency is different from a frequency of a carrier frequency of the serving cell, where the second synchronization signal is used to instruct any neighboring user equipment on the third transmission carrier frequency to perform synchronization according to a synchronization signal sent by the user equipment, so that a problem of synchronization between different user equipments in a multi-carrier frequency transmission scenario can be resolved.

Figure 18:
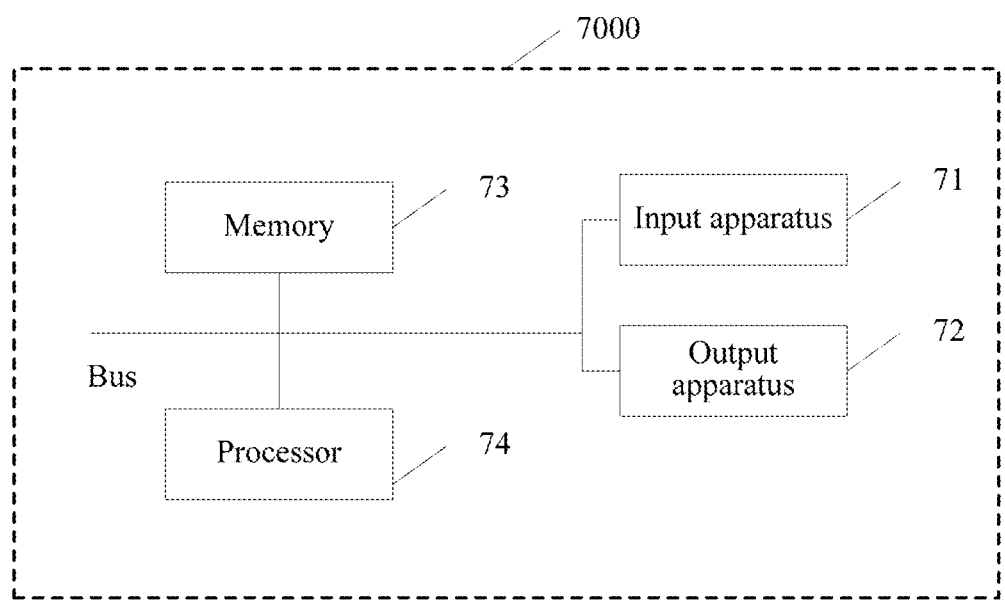
FIG. 18 is a schematic structural diagram of still another user equipment according to an embodiment of the present invention.

FIG. 18 is a schematic structural diagram of still another user equipment according to an embodiment of the present invention. User equipment 7000 includes an input apparatus 71, an output apparatus 72, a memory 73, and a processor 74 (there may be one or more processors 74 in the user equipment, and FIG. 18 uses an example in which there is one processor). In some embodiments of the present invention, the input apparatus 71, the output apparatus 72, the memory 73, and the processor 74 may be connected by using a bus or in another manner, and FIG. 18 uses an example in which connection is implemented by using a bus.

The processor 74 is configured to perform the following steps:

acquiring synchronization source detection control information of a serving cell, where the serving cell is located on a first transmission carrier frequency;

acquiring an identity of a first synchronization signal sent by a first synchronization source that is obtained through searching on a second transmission carrier frequency, and signal quality of the first synchronization source; and determining, according to the identity of the first synchronization signal, the signal quality of the first synchronization source, and the synchronization source detection control information, whether to use the first synchronization source as a synchronization source that performs D2D communication on a third transmission carrier frequency, where a frequency of the third transmission carrier frequency is different from a frequency of the first transmission carrier frequency.

In an implementation manner, before the performing, by the processor, the step of acquiring an identity of a first synchronization signal sent by a first synchronization source that is obtained through searching on a second transmission carrier frequency, and signal quality of the first synchronization source, the processor further performs the following step:

acquiring information about a frequency of the second transmission carrier frequency by using preconfigured information, by receiving system broadcast information sent by the serving cell, or by receiving RRC dedicated control signaling sent by the serving cell, where the information about the frequency is used to instruct the user equipment to search for a synchronization signal on the second transmission carrier frequency corresponding to the information about the frequency.

In another implementation manner, the synchronization source detection control information includes a dedicated synchronization signal identity and a first preset threshold; and the performing, by the processor, the step of determining, according to the identity of the first synchronization signal, the signal quality of the first synchronization source, and the synchronization source detection control information, whether to use the first synchronization source as a synchronization source that performs D2D communication on a third transmission carrier frequency includes:

when the identity of the first synchronization signal is the same as the dedicated synchronization signal identity and the signal quality of the first synchronization source is greater than the first preset threshold, determining to use the first synchronization source as the synchronization source that performs D2D communication on the third transmission carrier frequency.

In still another implementation manner, the synchronization source detection control information further includes a dedicated synchronization signal identity, a priority corresponding to the dedicated synchronization signal identity, and a second preset threshold; and the performing, by the processor, the step of determining, according to the identity of the first synchronization signal, the signal quality of the first synchronization source, and the synchronization source detection control information, whether to use the first synchronization source as a synchronization source that performs D2D communication on a third transmission carrier frequency includes:

when the identity of the first synchronization signal is the same as the dedicated synchronization signal identity and the signal quality of the first synchronization source is greater than the second preset threshold, determining that the first synchronization source is a candidate synchronization source; and when at least one candidate synchronization source is determined, determining that a synchronization source with a highest priority corresponding to a dedicated synchronization signal identity in the at least one candidate synchronization source is the synchronization source that performs D2D communication on the third transmission carrier frequency.

In still another implementation manner, the user equipment further performs the following step:

acquiring the synchronization source detection control information by using preconfigured information, by receiving system information broadcast by the serving cell, or by receiving RRC dedicated control signaling sent by the serving cell.

According to the user equipment provided in this embodiment of the present invention, the user equipment acquires synchronization source detection control information of a serving cell, acquires an identity of a first synchronization signal sent by a first synchronization source that is obtained through searching on a second transmission carrier frequency, and signal quality of the first synchronization source, and determines, according to the identity of the first synchronization signal, the signal quality of the first synchronization source, and the synchronization source detection control information, whether to use the first synchronization source as a synchronization source that performs D2D communication on a third transmission carrier frequency whose frequency is different from a frequency of a carrier frequency of the serving cell, to perform D2D communication according to the determined synchronization source.

Figure 19:
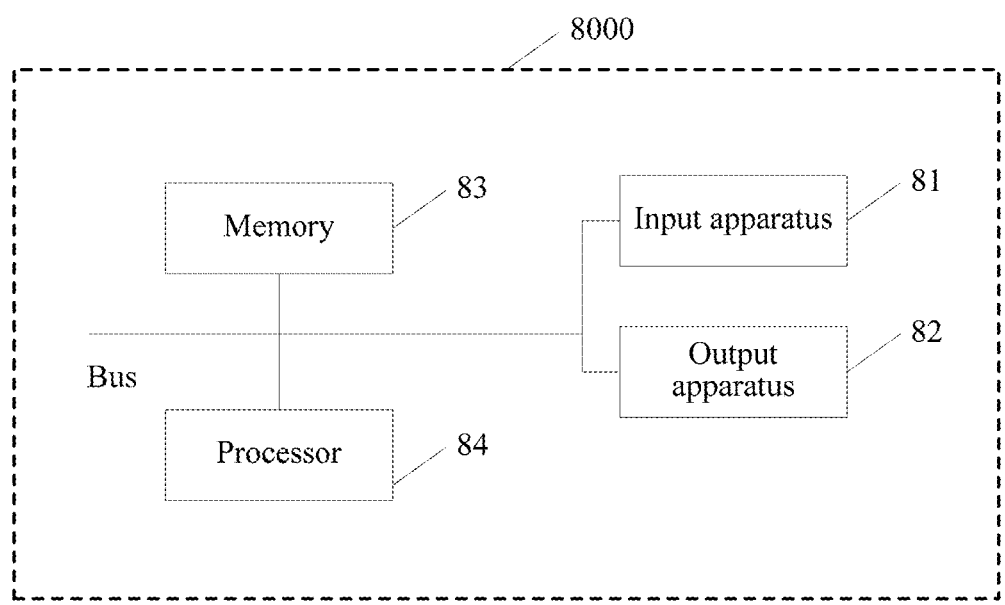
FIG. 19 is a schematic structural diagram of still another serving cell according to an embodiment of the present invention.

FIG. 19 is a schematic structural diagram of still another serving cell according to an embodiment of the present invention. User equipment 8000 includes an input apparatus 81, an output apparatus 82, a memory 83, and a processor 84 (there may be one or more processors 74 in the serving cell, and FIG. 19 uses an example in which there is one processor). In some embodiments of the present invention, the input apparatus 81, the output apparatus 82, the memory 83, and the processor 84 may be connected by using a bus or in another manner, and FIG. 19 uses an example in which connection is implemented by using a bus.

The processor 84 is configured to perform the following steps:

sending synchronization control information to first user equipment, where the synchronization control information is used to instruct the first user equipment to acquire an identity of a first synchronization signal sent by a first synchronization source that is obtained through searching on a second transmission carrier frequency, and signal quality of the first synchronization source, and determine, according to the identity of the first synchronization signal and the signal quality of the first synchronization source, whether to send a second synchronization signal on a third transmission carrier frequency, the serving cell is located on a first transmission carrier frequency, and a frequency of the first transmission carrier frequency is different from a frequency of the third transmission carrier frequency; and sending synchronization source detection control information to second user equipment, where the synchronization source detection control information is used to instruct the second user equipment to acquire an identity of a third synchronization signal sent by a second synchronization source that is obtained through searching on a fourth transmission carrier frequency, and signal quality of a third synchronization source, and determine, according to the identity of the third synchronization signal and the signal quality of the third synchronization source, whether to use the second synchronization source as a synchronization source that performs D2D communication on a fifth transmission carrier frequency, and a frequency of the fifth transmission carrier frequency is different from the frequency of the first transmission carrier frequency.

In an implementation manner, the processor further performs the following steps:

receiving the identity of the first synchronization signal and the signal quality of the first synchronization source that are sent by the first user equipment; and sending dedicated indication information to the first user equipment according to the identity of the first synchronization signal and the signal quality of the first synchronization source, where the dedicated indication information is used to instruct the first user equipment to determine the second synchronization signal according to the dedicated indication information.

According to the serving cell provided in this embodiment of the present invention, user equipment may determine, according to an identity of a synchronization signal obtained through searching, signal quality of a synchronization source, and synchronization control information of the serving cell, whether to start to send a synchronization signal; if it is determined to start to send a synchronization signal, the user equipment sends a second synchronization signal on a dedicated transmission carrier frequency whose frequency is different from a frequency of a carrier frequency of the serving cell, to control any neighboring user equipment on the dedicated transmission carrier frequency to perform synchronization according to a synchronization signal sent by the user equipment; and the user equipment determines, according to the identity of the synchronization signal obtained through searching, the signal quality of the synchronization source, and synchronization source detection control information of the serving cell, whether to use the synchronization source obtained through searching as a synchronization source that performs D2D communication on the dedicated transmission carrier frequency whose frequency is different from the frequency of the carrier frequency of the serving cell, to perform D2D communication according to the determined synchronization source.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also understand that all the embodiments described in this specification belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

A sequence of the steps of the method in the embodiments of the present invention may be adjusted, and certain steps may also be merged or removed according to an actual need.

Merging, division, and removing may be performed on the units in the embodiments of the present invention according to an actual need. A person skilled in the art may combine different embodiments or features of different embodiments described in this specification.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (RAM), a read-only memory (ROM), an electrically erasable programmable read-only memory (eeprom), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention. Additionally, statements made herein characterizing the invention refer to an embodiment of the invention and not necessarily all embodiments.

What is claimed is:

1. A device-to-device (D2D) synchronization method, wherein the method comprises:
  acquiring, by a first user equipment, synchronization control information of a serving cell, wherein the serving cell is located on a first transmission carrier frequency;
  acquiring, by the first user equipment, an identity of a first synchronization signal from a first synchronization source, and signal quality of the first synchronization source, wherein the first synchronization signal is obtained through searching on a second transmission carrier frequency;
  determining, by the first user equipment, whether to start to send a synchronization signal according to the identity of the first synchronization signal, the signal quality of the first synchronization source, and the synchronization control information; and
  in response to a determination to start to send a synchronization signal, sending, by the first user equipment, a second synchronization signal on a third transmission carrier frequency, wherein the second synchronization signal indicates that at least one second user equipment on the third transmission carrier frequency is to perform synchronization according to the second synchronization signal, and wherein a frequency of the third transmission carrier frequency is different from a frequency of the first transmission carrier frequency;
  wherein the synchronization control information comprises a dedicated synchronization signal identity and a first preset threshold; and
  wherein determining whether to start to send a synchronization signal comprises:
    based on the identity of the first synchronization signal being the same as the dedicated synchronization signal identity and the signal quality of the first synchronization source being less than the first preset threshold, determining, by the first user equipment, to start to send a synchronization signal; or
    based on no synchronization signal being obtained through searching, determining, by the first user equipment, to start to send a synchronization signal.

2. The method according to claim 1, wherein before acquiring the identity of the first synchronization signal and the signal quality of the first synchronization source, the method further comprises:
  acquiring, by the first user equipment, information about a frequency of the second transmission carrier frequency by using preconfigured information, by receiving system broadcast information from the serving cell, or by receiving Radio Resource Control (RRC) dedicated signaling from the serving cell, wherein the information about the frequency of the second transmission carrier frequency indicates that the first user equipment is to search for a synchronization signal on the second transmission carrier frequency corresponding to the information about the frequency of the second transmission carrier frequency.

3. The method according to claim 1, wherein after determining to start to send a synchronization signal, the method further comprises:
  using, by the first user equipment, a synchronization signal corresponding to the dedicated synchronization signal identity as the second synchronization signal; or
  sending, by the first user equipment, the identity of the first synchronization signal and the signal quality of the first synchronization source to the serving cell;
  wherein the method further comprises:
  receiving, by the first user equipment, dedicated indication information from the serving cell; and
  using, by the first user equipment, a synchronization signal corresponding to the dedicated synchronization signal identity as the second synchronization signal according to the dedicated indication information.

4. The method according to claim 1, wherein the frequency of the second transmission carrier frequency is the same as the frequency of the third transmission carrier frequency.

5. The method according to claim 1, wherein the synchronization control information further comprises a priority corresponding to the dedicated synchronization signal identity, a second preset priority, and a fourth preset threshold; and
  wherein determining whether to start to send a synchronization signal comprises:
    based on the identity of the first synchronization signal being the same as the dedicated synchronization signal identity, the priority corresponding to the dedicated synchronization signal identity being less than the second preset priority, and the signal quality of the first synchronization source being greater than the fourth preset threshold, determining, by the first user equipment, to start to send a synchronization signal.

6. The method according to claim 5, wherein the dedicated synchronization signal identity comprises: a physical cell identity (PCI), a sidelink synchronization signal identity (SLSSID), a public land mobile network (PLMN) identity, or a transmission carrier frequency identity.

7. The method according to of claim 1, wherein the method further comprises:
acquiring the synchronization control information by using preconfigured information, by receiving system information from the serving cell, or by receiving Radio Resource Control (RRC) dedicated control signaling from the serving cell.

8. A user equipment, wherein the user equipment comprises:
a non-transitory computer-readable medium having processor-executable instructions stored thereon;
a processor, configured to execute the processor-executable instructions to facilitate:
acquiring synchronization control information of a serving cell, wherein the serving cell is located on a first transmission carrier frequency;
acquiring an identity of a first synchronization signal from a first synchronization source that is obtained through searching on a second transmission carrier frequency, and signal quality of the first synchronization source;
determining whether to start to send a synchronization signal according to the identity of the first synchronization signal, the signal quality of the first synchronization source, and the synchronization control information; and
in response to a determination to start to send a synchronization signal, sending a second synchronization signal on a third transmission carrier frequency, wherein the second synchronization signal indicates that at least one second user equipment on the third transmission carrier frequency is to perform synchronization according to the second synchronization signal, and wherein a frequency of the third transmission carrier frequency is different from a frequency of the first transmission carrier frequency;
wherein the synchronization control information comprises a dedicated synchronization signal identity and a first preset threshold; and
wherein determining whether to start to send a synchronization signal comprises:
based on the identity of the first synchronization signal being the same as the dedicated synchronization signal identity and the signal quality of the first synchronization source being less than the first preset threshold, determining to start to send a synchronization signal; or
based on no synchronization signal being obtained through searching, determining to start to send a synchronization signal.

9. The user equipment according to claim 8, wherein the processor is further configured to execute the processor-executable instructions to facilitate:
acquiring information about a frequency of the second transmission carrier frequency by using preconfigured information, by receiving system broadcast information from the serving cell, or by receiving Radio Resource Control (RRC) dedicated control signaling from the serving cell, wherein the information about the frequency indicates that the first user equipment is to search for a synchronization signal on the second transmission carrier frequency corresponding to the information about the frequency.

10. The user equipment according to claim 8, wherein the processor is further configured to execute the processor-executable instructions to facilitate:
using a synchronization signal corresponding to the dedicated synchronization signal identity as the second synchronization signal; or
sending the identity of the first synchronization signal and the signal quality of the first synchronization source to the serving cell;
wherein the processor is further configured to execute the processor-executable instructions to facilitate:
receiving dedicated indication information from the serving cell; and
using a synchronization signal corresponding to the dedicated synchronization signal identity as the second synchronization signal according to the dedicated indication information.

11. The user equipment according to claim 8, wherein the frequency of the second transmission carrier frequency is the same as the frequency of the third transmission carrier frequency.

12. The user equipment according to claim 8, wherein the dedicated synchronization signal identity comprises: a physical cell identity (PCI), a sidelink synchronization signal identity (SLSSID), a public land mobile network (PLMN) identity, or a transmission carrier frequency identity.

13. The user equipment according to claim 8, wherein the processor is further configured to execute the processor-executable instructions to facilitate:
acquiring the synchronization control information by using preconfigured information, by receiving system information from the serving cell, or by receiving Radio Resource Control (RRC) dedicated control signaling from the serving cell.

14. A non-transitory computer-readable medium having processor-executable instructions stored thereon, wherein the processor-executable instructions, when executed, facilitate:
acquiring synchronization control information of a serving cell, wherein the serving cell is located on a first transmission carrier frequency;
acquiring an identity of a first synchronization signal from a first synchronization source, and signal quality of the first synchronization source, wherein the first synchronization signal is obtained through searching on a second transmission carrier frequency;
determining whether to start to send a synchronization signal according to the identity of the first synchronization signal, the signal quality of the first synchronization source, and the synchronization control information; and
in response to a determination to start to send a synchronization signal, sending a second synchronization signal on a third transmission carrier frequency, wherein the second synchronization signal indicates that at least one second user equipment on the third transmission carrier frequency is to perform synchronization according to the second synchronization signal, and wherein a frequency of the third transmission carrier frequency is different from a frequency of the first transmission carrier frequency, wherein the synchronization control information comprises a dedicated synchronization signal identity and a first preset threshold; and wherein determining whether to start to send a synchronization signal comprises:

based on the identity of the first synchronization signal being the same as the dedicated synchronization signal identity and the signal quality of the first synchronization source being less than the first preset threshold, determining to start to send a synchronization signal; or based on no synchronization signal being obtained through searching, determining to start to send a synchronization signal.

15. The non-transitory computer-readable medium according to claim 14, wherein the processor-executable instructions, when executed, further facilitate:

using a synchronization signal corresponding to the dedicated synchronization signal identity as the second synchronization signal; or sending the identity of the first synchronization signal and the signal quality of the first synchronization source to the serving cell;

wherein the processor-executable instructions, when executed, further facilitate:

receiving dedicated indication information from the serving cell; and using a synchronization signal corresponding to the dedicated synchronization signal identity as the second synchronization signal according to the dedicated indication information.

16. The non-transitory computer-readable medium according to claim 14, wherein the frequency of the second transmission carrier frequency is the same as the frequency of the third transmission carrier frequency.

17. The non-transitory computer-readable medium according to claim 14, wherein the synchronization control information further comprises a priority corresponding to the dedicated synchronization signal identity, a second preset priority, and a fourth preset threshold; and wherein determining whether to start to send a synchronization signal comprises: based on the identity of the first synchronization signal being the same as the dedicated synchronization signal identity, the priority corresponding to the dedicated synchronization signal identity being less than the second preset priority, and the signal quality of the first synchronization source being greater than the fourth preset threshold, determining to start to send a synchronization signal.

18. The non-transitory computer-readable medium according to claim 17, wherein the dedicated synchronization signal identity comprises: a physical cell identity (PCI), a sidelink synchronization signal identity (SLSSID), a public land mobile network (PLMN) identity, or a transmission carrier frequency identity.

19. The non-transitory computer-readable medium according to of claim 14, wherein the processor-executable instructions, when executed, further facilitate:

acquiring the synchronization control information by using preconfigured information, by receiving system information from the serving cell, or by receiving Radio Resource Control (RRC) dedicated control signaling from the serving cell.

* * * * *